US010761787B1

(12) United States Patent
Rajendran et al.

(10) Patent No.: US 10,761,787 B1
(45) Date of Patent: Sep. 1, 2020

(54) METHOD AND SYSTEM FOR DETECTION AND AVOIDANCE OF DUPLICATE PRINT JOBS WITH PRE-IMAGING TECHNIQUE USING DOCUMENT STACKER AND CENTRAL SYSTEM

(71) Applicant: Konica Minolta Laboratory U.S.A., Inc., San Mateo, CA (US)

(72) Inventors: Prasanna Kumar Rajendran, Mountain View, CA (US); Ryoichi Yokoohji, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/369,194

(22) Filed: Mar. 29, 2019

(51) Int. Cl.
*G06F 3/12* (2006.01)
*H04N 1/00* (2006.01)

(52) U.S. Cl.
CPC .......... *G06F 3/1219* (2013.01); *G06F 3/1273* (2013.01); *G06F 3/1275* (2013.01); *G06F 3/1288* (2013.01); *G06F 3/1296* (2013.01); *H04N 1/0084* (2013.01); *H04N 1/00832* (2013.01); *H04N 1/00862* (2013.01); *H04N 1/00877* (2013.01)

(58) Field of Classification Search
CPC .... G06F 3/1219; G06F 3/1275; G06F 3/1296; G06F 3/1273; G06F 3/1288; H04N 1/0084; H04N 1/00877; H04N 1/00832; H04N 1/00862
See application file for complete search history.

(56) References Cited

U.S. PATENT DOCUMENTS

| 5,532,839 | A | | 7/1996 | Beikirch et al. | |
|---|---|---|---|---|---|
| 5,610,724 | A | * | 3/1997 | Kaneko | G06K 15/00 358/400 |
| 5,815,764 | A | * | 9/1998 | Tomory | B65H 31/24 399/1 |
| 7,389,985 | B2 | * | 6/2008 | Schaefer | B65H 39/10 270/52.03 |
| 8,256,008 | B2 | * | 8/2012 | Hayano | B65H 39/10 713/1 |
| 2008/0062453 | A1 | | 3/2008 | Bostick et al. | |

* cited by examiner

*Primary Examiner* — Neil R McLean
(74) *Attorney, Agent, or Firm* — Buchanan Ingersoll & Rooney PC

(57) ABSTRACT

A method, a non-transitory computer readable medium, and a system are disclosed for detection and avoidance of printing of previously printed print jobs. The method includes storing one or more digital copies of print jobs in a central storage system; storing one or more physical copies of the one or more digital copies of the print jobs in a document stacker; receiving a print job on a printer; sending a request from the printer to the central storage system to determine if a physical copy of the print job is in the document stacker; and when the print job is in the document stacker sending a code from the central storage system for retrieval of a physical copy of the print job from the document stacker.

20 Claims, 19 Drawing Sheets

METHOD AND SYSTEM FOR DETECTION AND AVOIDANCE OF DUPLICATE PRINT JOBS WITH PRE-IMAGING TECHNIQUE USING DOCUMENT STACKER AND CENTRAL SYSTEM

FIELD OF THE INVENTION

The present disclosure generally relates to a method and system for detection and avoidance of duplicate print jobs with pre-imaging technique using document stacker and central system.

BACKGROUND OF THE INVENTION

When a print job is submitted to a printer, the printer is not configured to check, for example, in a cache, to see if the print job has been previously printed and physical copy of the print job saved in a location in which the document can be retrieved.

SUMMARY OF THE INVENTION

In consideration of the above, it would be desirable to have a method and system for reusing previously printed documents in place of new prints of the same document in order to avoid duplicate prints and to save resources. In addition, the present disclosure can help reduce the printing of used or previously printed documents, and hence, a saving of resources and energy can be attained.

A method is disclosed to detect and avoid printing of print jobs previously printed, the method comprising: storing one or more digital copies of print jobs in a central storage system; storing one or more physical copies of the one or more digital copies of the print jobs in a document stacker; receiving a print job on a printer; sending a request from the printer to the central storage system to determine if a physical copy of the print job is in the document stacker; and when the print job is in the document stacker sending a code from the central storage system for retrieval of a physical copy of the print job from the document stacker.

A non-transitory computer readable medium (CRM) storing computer program code executed by a computer processor is disclosed that performs a method for detection and avoidance of printing print jobs previously printed, the method comprising: storing one or more digital copies of print jobs in a central storage system; storing one or more physical copies of the one or more digital copies of the print jobs in a document stacker; receiving a print job on a printer; sending a request from the printer to the central storage system to determine if a physical copy of the print job is in the document stacker; and when the print job is in the document stacker sending a code from the central storage system for retrieval of a physical copy of the print job from the document stacker.

A system is disclosed for detection and avoidance of printing print jobs previously printed, the system comprising: a server having a memory and a processor, the processor configured to: store one or more digital copies of print jobs; a document stacker configured to: scan one or more physical copies of the one or more digital copies of the print jobs; send the one or more digital copies of the print jobs to the central storage system from the document stacker; store the one or more physical copies scanned by the document stacker in trays; and shred the physical copies of the one or more digital copies of print jobs stored in the document stacker upon an expiration of a predetermined date assigned to the print jobs; and a printer configured to: receive a print job; sending a request from the printer to the server to determine if a physical copy of the print job is in the document stacker; and when the print job is in the document stacker receiving a code from the server for retrieval of a physical copy of the print job from the document stacker It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
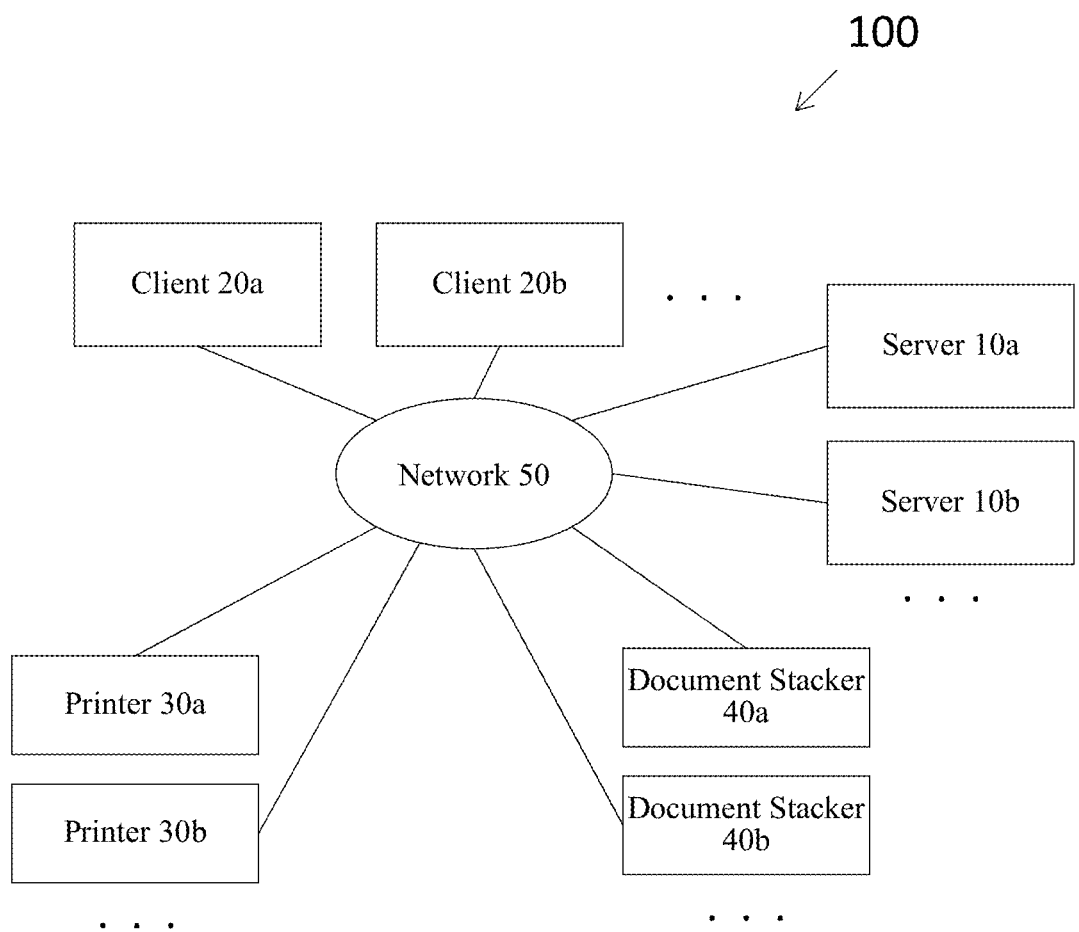
FIG. 1 is an illustration of a system for detection and avoidance of duplicate print jobs with a pre-imaging technique using a document stacker and a central system.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to have a system, which identifies the existences of previously printed and reusable documents instead of creating a new document by printing, and which can save resources and time.

FIG. 1 is an illustration of a system 100 for detection and avoidance of duplicate print jobs with a pre-imaging technique using a document stacker and a central system. As shown in FIG. 1, the system 100 includes one or more servers 10a, 10b, one or more client devices 20a, 20b, one or more printers 30a, 30b, one or more document stackers 40a, 40b, and a communication network 50. The communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, each of the one or more client devices 20a, 20b, can be, for example, a personal computer (PC), a laptop, a mobile computing device (e.g., tablet PC, smartphone, etc.), a server, a mainframe, or a kiosk. As shown in FIG. 1, each of the one or more servers 10a, 10b, the one or more client devices 20a, 20b, the one or more printers 30a, 30b, and the one or more document stackers 40a, 40b, can be connected to each other by one or more communication networks 50 of any size having wired and/or wireless segments. In accordance with an exemplary embodiment, a different user can operate each of the one or more client devices 20a, 20b.

Figure 2:
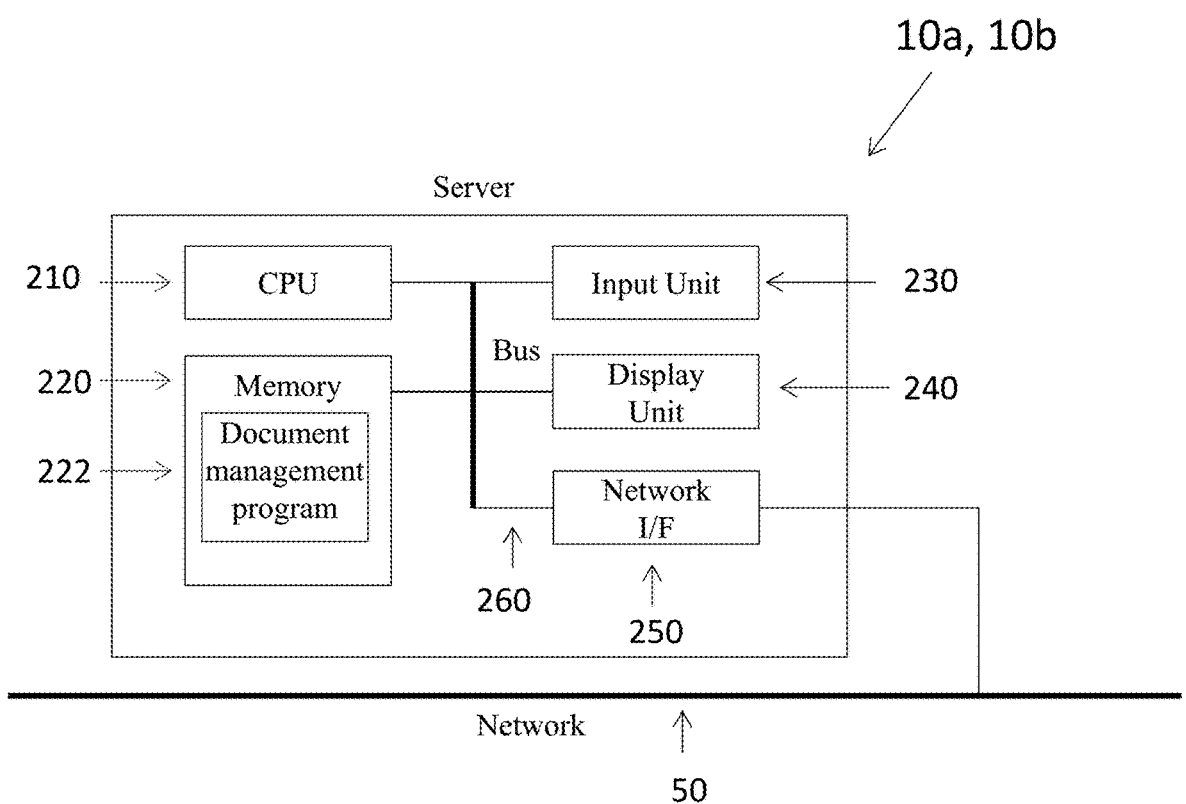
FIG. 2 is an illustration of a server in accordance with an exemplary embodiment.

FIG. 2 is an illustration of a server 10a, 10b in accordance with an exemplary embodiment. As shown in FIG. 2, each of the one or more servers 10a, 10b can include a processor or central processing unit (CPU) 210, and one or more memories 220 for storing software programs and data, which can include a document management program 222. The processor or CPU 210 is configured to carry out the instructions of a computer program, which operates and/or controls at least a portion of the functionality of the server 10a, 10b. The server 10a, 10b can also include an input unit 230, a display unit or graphical user interface (GUI) 240, and a network interface (I/F) 250, which is connected to a communication network (or network) 50. A bus 260 can connect the various components 210, 220, 230, 240, and 250 within server 10a, 10b. The server 10a, 10b includes an operating system (OS), which manages the computer hardware and provides common services for efficient execution of various software programs as disclosed herein.

Figure 3:
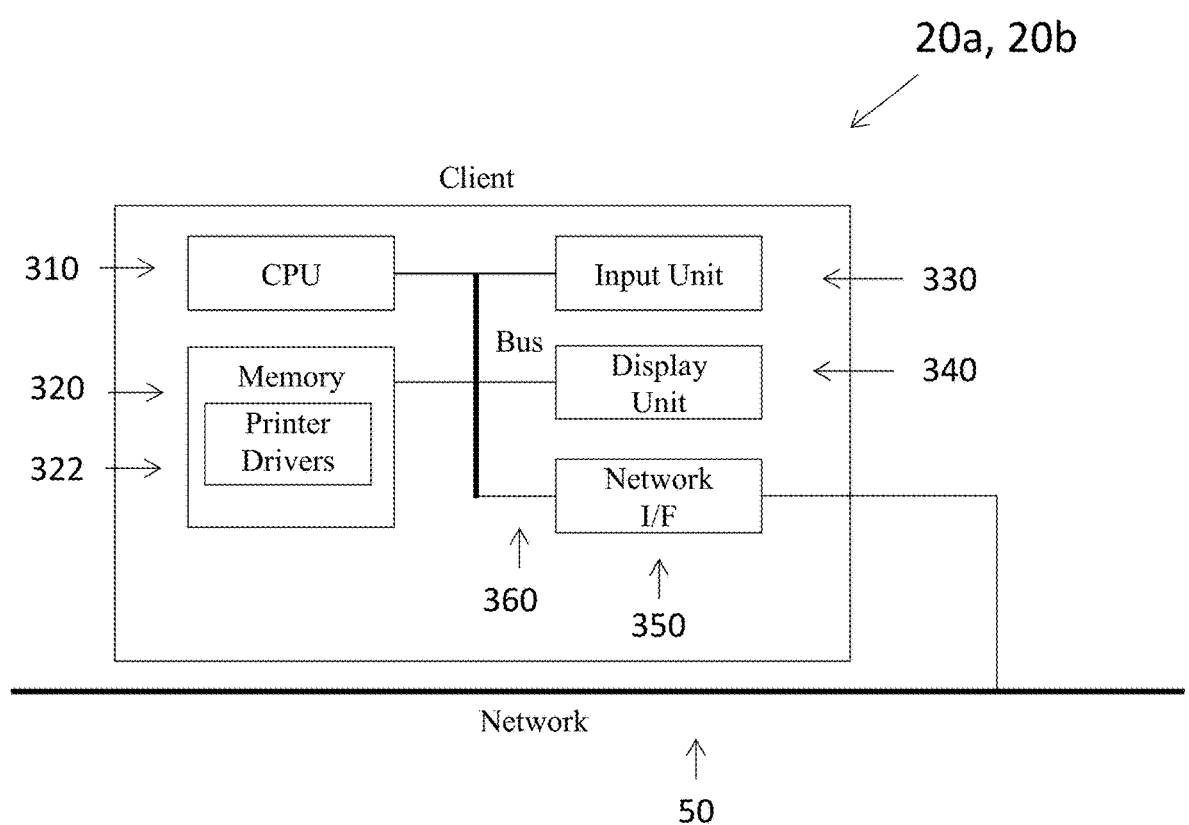
FIG. 3 is an illustration of a client or client device in accordance with an exemplary embodiment.

FIG. 3 is an illustration of a client device or client computer 20a, 20b in accordance with an exemplary embodiment. As shown in FIG. 3, the client device or client computer 20a, 20b the exemplary host computer or client computer 20 can include a processor or central processing unit (CPU) 310, and one or more memories 320 for storing software programs and data (such as files to be printed), and printer drivers 322. The processor or CPU 310 carries out the instructions of a computer program, which operates and/or controls at least a portion of the functionality of the client computer 20a, 20b. The client computer 20a, 20b can also include an input unit 330, a display unit or graphical user interface (GUI) 340, and a network interface (I/F) 350, which is connected to a communication network (or network) 50. A bus 360 can connect the various components 310, 320, 330, 340, and 350 within the client computer 20a, 20b.

The client computer 20a, 20b includes an operating system (OS), which manages the computer hardware and provides common services for efficient execution of various software programs. The software programs can include, for example, application software and printer driver software. In addition, the printer driver software can control transmission of the print job from the client computer 20a, 20b to the one or more servers 10a, 10b, the one or more printers or printing devices 30a, 30b, and the one or more document stackers 40a, 40b.

Figure 4:
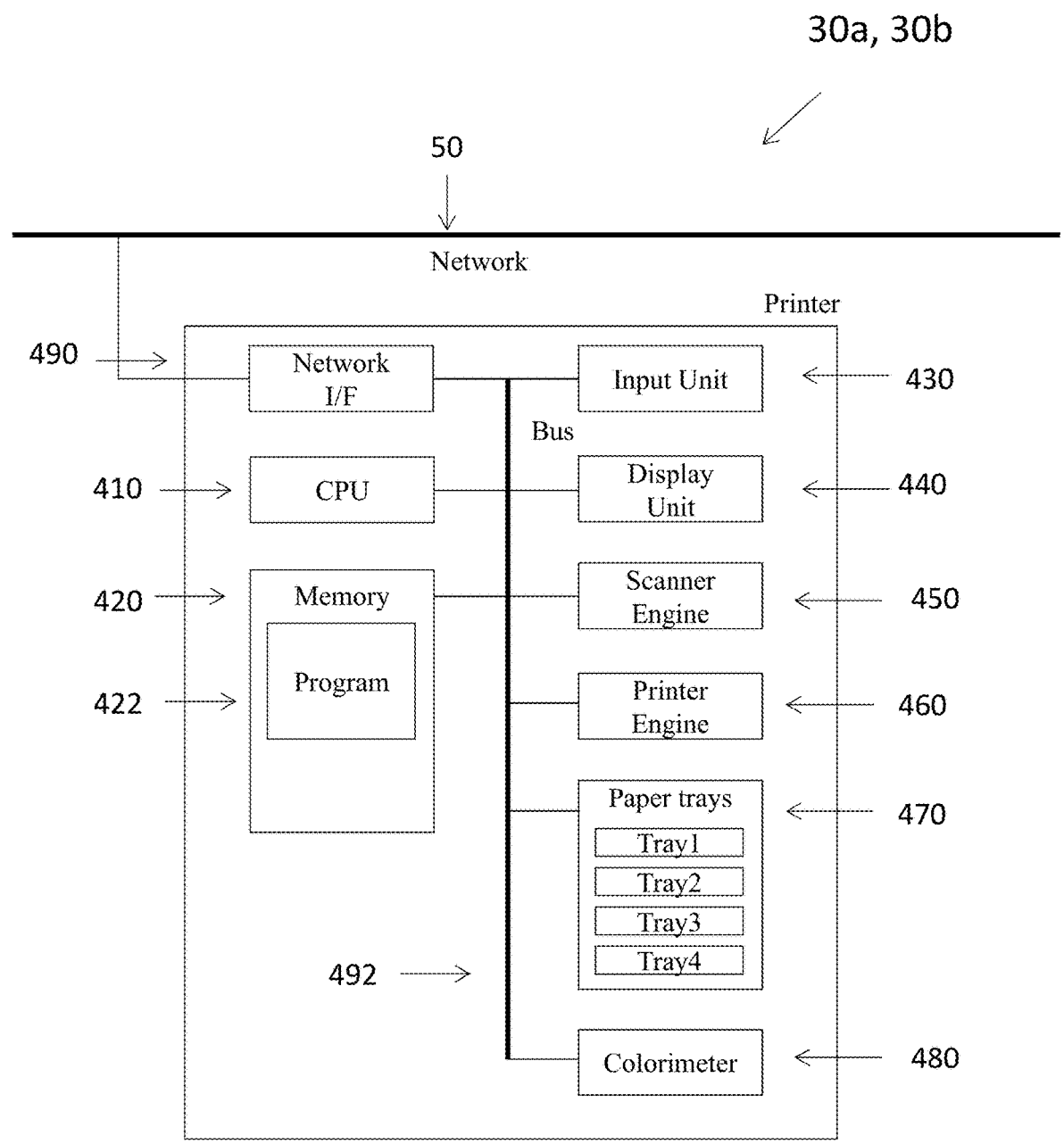
FIG. 4 is an illustration of a printer in accordance with an exemplary embodiment.

FIG. 4 is an illustration of a printer or printing device 30a, 30b in accordance with an exemplary embodiment. As shown in FIG. 4, the printer or printing device 30a, 30b can include a network interface (I/F) 490, which is connected to the communication network (or network) 50, a processor or central processing unit (CPU) 410, and one or more memories 420 for storing software programs and data (such as files to be printed) 422. For example, the software programs 422 can include a printer controller and a tray table. The processor or CPU 410 carries out the instructions of a computer program, which operates and/or controls at least a portion of the functionality of the printer 30a, 30b. The printer 30a, 30b can also include an input unit 430, a display unit or graphical user interface (GUI) 440, a scanner engine (or scanner) 450, a printer engine 460, a plurality of paper trays 470, and a colorimeter 480.

In accordance with an exemplary embodiment, the colorimeter 480 can be an inline colorimeter (ICCU) (or spectrophotometer), which measures printed color patches in order to generate color profiles. In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 492 can connect the various components 410, 420, 430, 440, 450, 460, 470, 480, and 490 within the printer 30a, 30b. The printer 30a, 30b also includes an operating system (OS), which manages the computer hardware and provides common services for efficient execution of various software programs. In accordance with an exemplary embodiment, it can be within the scope of the disclosure for the printer 30a, 30b to be a copier.

For example, in accordance with an exemplary embodiment, an image processing section within the printer 30a, 30b can carry out various image processing under the control of a print controller or CPU 410, and sends the processed print image data to the print engine 460. The image processing section can also include a scanner section (scanner engine 450) for optically reading a document, such as an image recognition system. The scanner section receives the image from the scanner engine 450 and converts the image into a digital image. The print engine 460 forms an image on a print media (or recording sheet) based on the image data sent from the image processing section. The central processing unit (CPU) (or processor) 410 and the memory 420 can include a program for RIP processing (Raster Image Processing), which is a process for converting print data included in a print job into Raster Image data to be used in the printer or print engine 460. The CPU 410 can include a printer controller configured to process the data and job information received from the one or more servers 10a, 10b, or the one or more client computers 20a, 20b, for example, received via the network connection unit and/or input/output section (I/O section) 490.

The CPU 410 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 20a, 20b to generate a print image.

In accordance with an exemplary embodiment, the network I/F 490 performs data transfer with the one or more servers 10a, 10b, and the one or more client devices 20a, 20b. The printer controller can be programmed to process data and control various other components of the multi-function peripheral to carry out the various methods described herein. In accordance with an exemplary embodiment, the operation of printer section commences when the printer section receives a page description from the one or more servers 10a, 10b, and the one or more client devices 20a, 20b via the network I/F 490 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 30a, 30b consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the printer 30a, 30b can also include at least one auto tray or paper tray 470, and more preferably a plurality of auto trays or paper trays. Each auto tray or paper tray 470 can include a bin or tray, which holds a stack of a print media (not shown), for example, a paper or a paper-like product. The printer engine or print engine 460 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the printer 30a, 30b, for example, on printer configuration settings of the printer 30a, 30b to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 5:
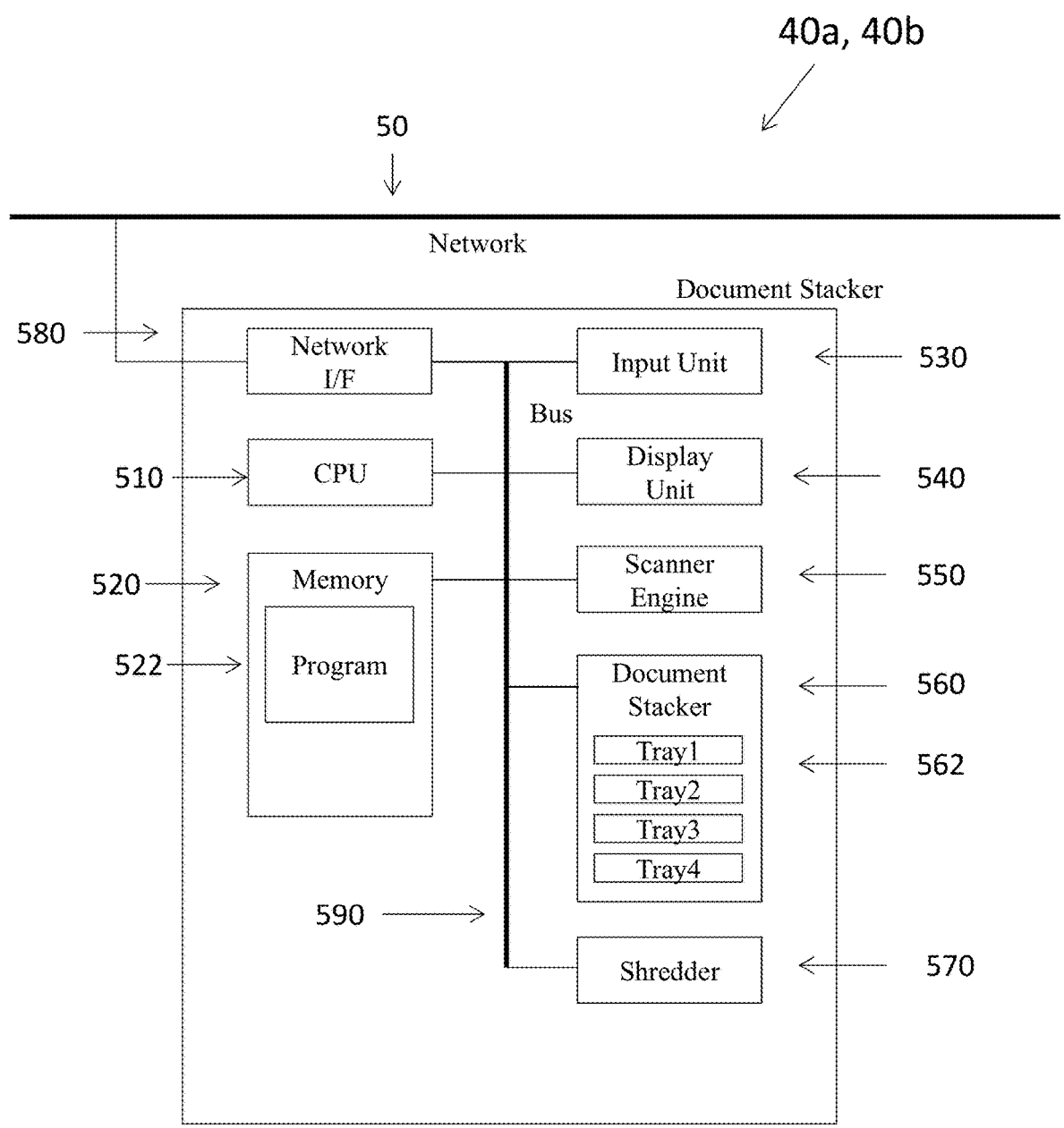
FIG. 5 is an illustration of a document stacker in accordance with an exemplary embodiment.

FIG. 5 is an illustration of a document stacker 40a, 40b in accordance with an exemplary embodiment. As shown in FIG. 5, the document stacker 40a, 40b can include a network interface (I/F) 580, which is connected to the communication network (or network) 50, a processor or central processing unit (CPU) 510, and one or more memories 520 for storing software programs and data (such as files to be printed) 522. The processor or CPU 510 carries out the instructions of a computer program, which operates and/or controls at least a portion of the functionality of the document stacker 40a, 40b. The document stacker 40a, 40b can also include an input unit 530, a display unit or graphical user interface (GUI) 540, a scanner engine (or scanner) 550, a document stacker 560 having a plurality of slots or trays 562, and a shredder 570. In accordance with an exemplary embodiment, the shredder 570 is a document shredder configured to shred documents in accordance with the methods disclosed herein. A bus 590 can connect the various components 510, 520, 530, 540, 550, 560, 570, and 580 within the document stacker 40a, 40b. The document stacker 40a, 40b also includes an operating system (OS), which manages the computer hardware and provides common services for efficient execution of various software programs.

The CPU 510 can also include an operating system (OS), which acts as an intermediary between the software programs and hardware components within the document stacker 40a, 40b. The operating system (OS) manages the computer hardware and provides common services for efficient execution of various software applications. In accordance with an exemplary embodiment, the network I/F 580 performs data transfer with the one or more servers 10a, 10b, the one or more client devices 20a, 20b, and the one or more printers 30a, 30b.

In accordance with an exemplary embodiment, the method and system as disclosed herein can be implemented in one or more cases. For example, if a particular job is frequently printed out, the method and system as disclosed herein can be configured to monitor the printing of such documents and caches a digital file as well as print settings to printers' memory. Thus, when the user wants to print out the document with same job settings then it can be printed out relatively faster, or the user can overwrite the saved job settings.

In accordance with another embodiment, if a document has highlights, markings, and/or writings, the method and system as disclosed herein can be configured to capture the highlights, markings or writings, and can consider the highlights, markings, and/or writings to have relative importance. Once the same document is printed out, the method and system as disclosed herein can produce a summary based on sections that have been identified as important. For example, the user can choose to print the summary, which can save resources instead of printing an entire document, or alternatively, the document can be printed in its entirety.

In accordance with a further exemplary embodiment, the method and system as disclosed herein can collect and generate a comprehensive analytical report on number of papers saved, used and overall system usage. The document stacker collects the used documents, scans the document and assigns a unique id to each document it scans. In accordance with an exemplary embodiment the document stacker 40a, 40b can handle an entire life cycle of the document from creation to shredding. The central system, for example, the document management program 222 of the server 10a, 10b, in combination with the document stacker 40a, 40b generates metrics, which can be useful in one or more use cases.

In accordance with an exemplary embodiment, the server 10a, 10b (i.e., central system), can be part of one or more of the document stackers 40a, 40b, or alternatively, can be a separate server 10a, 10b, as shown, for example, in FIG. 1.

In accordance with an exemplary embodiment, the system and method can include one or more of the following steps: operator A (i.e., user A) send request to print document B; operator A finishes using document B and does not need the document; operator A feeds the document into the document stacker 40a, 40b; the document stacker 40a, 40b, scans the document, digitalizes and save the digital copy of the document to a central system; once printer gets a print request, the printer 30a, 30b sends a request to the central system to see whether there is a copy of the document in one or more of the document stackers 40a, 40b; if the document is saved in one or more of the document stackers 40a, 40b, (i.e., yes), the central system responds with a location of document stacker 40a, 40b, and generates a code to input into, for example, on the digital display unit 540 of the document stacker 40a, 40b, the code information is sent to the document stacker 40a, 40b, and the corresponding printer 30a, 30b where the print job was received, and the printer responds to the user with location information of the document stacker 40a, 40b, and the code; and if the document is not available, (i.e., no), then the printer 30a, 30b can print a hard copy of the requested document.

In accordance with an exemplary embodiment, upon receipt of the code from the central system, the user goes to specified document stacker 40a, 40b, and enters the given code. The document stacker 40a, 40b, releases the document associated with the code and notifies to the central system (i.e., document management program 222) that the document has been released.

For example, in case a document is split, for example, in a case where partial documents are all in the same document stacker 40a, 40b, in two or more trays 562, the central system (i.e., document management program 222) signals the document stacker 40a, 40b, which is has all of the document information, and the document stacker 40a, 40b compiles the requested documents in a correct order.

Alternatively, in a case where partial documents are in more than one document stacker 40a, 40b, the central system (i.e., document management program 222) responds to the printer 30a, 30b, with each location of the document stackers 40a, 40b, and correct order of the document s (for example, with the corresponding codes for releasing the documents). The user goes to the document stackers 40a, 40b one by one and obtains the correct documents.

In accordance with an exemplary embodiment, if the requested document is present but not complete, the central system (i.e., document management program 222) responds with the locations of the one or more document stackers 40a, 40b and missing page information. The printer 30a, 30b prints missing page as well as respond to the user with document stacker information and the user collects documents in instructed order.

In accordance with an exemplary embodiment, the document stacker 40a, 40b can have a shredding mechanism (i.e., shredder 470). For example, the central system (i.e., document management program 222) can be configured to save a timestamp of the document entry into the document stacker 40a, 40b. If the document is not printed (used) for a certain period of time then the central system (i.e., document management program 222) signals the document stacker 40a, 40b to shred the document. In accordance with an exemplary embodiment, the document stacker 40a, 40b shreds the document, and the central system (i.e., document management program 222) removes the soft record of the document upon shredding.

In accordance with another exemplary embodiment, if a particular job is frequently printed out, the system can be configured to monitor the frequency of the printing of a document and caches digital file as well as print settings to printers' memory. When a user wants to print out the document with same job settings then the document can be printed out relatively faster, or user can overwrite the saved job settings.

In accordance with another embodiment, if a document has highlights, markings, and/or writings, the system can be configured to capture the highlights, markings, and/or writings and considers the highlights, markings, and/or writings to have importance. Once a same document is printed out or requested, the system can be configured to produce a summary based on sections, which have been identified as having importance. User can choose to print that summary, which can save resource, or alternatively, an entirety of the document can be printed. In addition, the system can be configured to collect and generate a comprehensive analytical report on number of documents (or pages) saved, number of documents retrieved from the document stacker 40a, 40b, and overall system usage. In accordance with an exemplary embodiment, in the system analytics, the system can be configured to generate a summary of the document, which a user may prefer to use by printing the summary instead of printing or retrieving the document from the document stacker 40a, 40b. For example, if several users reject determine that the summary is not helpful or is not printed, then the system can judge that the summary is not useful and can re-generate a new summary based on a feedback mechanism, for example, based on additional intelligence provide with language processing and/or machine learning.

In accordance with an exemplary embodiment, the system can be configured to generate document summary based on portions of documents, which have been highlighted, for example, the document is crawled for any user highlights, markings (including underline, circle, star, etc.) or writings. The document is scored based on these attributes. The system re-iterates the score of the previous copy of the same document and compares the score. If the document summary scores are different, the summary can be re-created with the new best score.

In accordance with another embodiment, the system can generate a summary overriding the scoring summary, for example, when the user's rejection to the system generated summary exceeds a predetermined threshold. In accordance with an exemplary embodiment, for example, the system can be configured to gather useful feedback from user, for example, from a list of questions, or a questionnaire, to determine the content type of the document, and, about any user feelings or sentiments on the summary. The user feedbacks can then be stored as feature vectors for using them in model training and improving the system's ability to produce efficient summaries using, for example, natural language processing (NLP) and machine learning techniques, which can help the system generate its own summary based on feedback previously obtained on documents. In addition, the system can provide a list or summary related to each of the document in the document stacker 40a, 40b, and the user can pick a summary, which the user believe is the closest match with the users' needs at the time.

Figure 6:
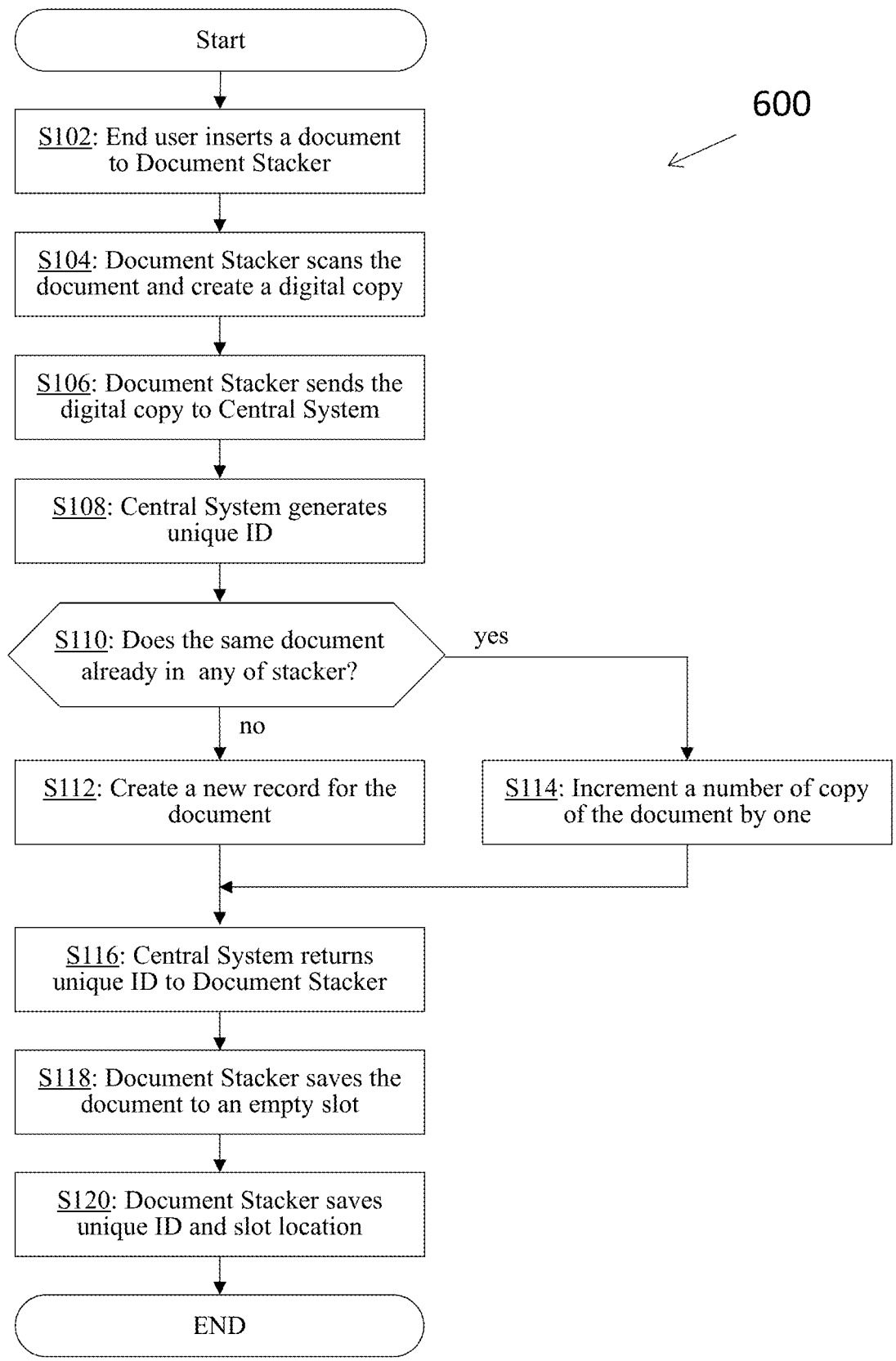
FIG. 6 is a flow chart illustrating saving a document in accordance with an exemplary embodiment.

FIG. 6 is a flow chart 600 illustrating saving a document in accordance with an exemplary embodiment. As shown in FIG. 6, in step S102, an end user inserts a document into the document stacker 40a, 40b. In step S104, the document stacker 40a, 40b, scans the document and creates a digital copy. In step S106, the document stacker 40a, 40b sends the digital copy to a central system, for example, to the document management program 222 in the memory 220 of the server 10a, 10b, or alternatively, the digital copy can be saved to the program 522 of the one or more memories 520 of the document stacker 40a, 40b. In step S108, the central system, for example, the document management program 222 in the memory 220 of the server 10a, 10b, generates a unique identifier (ID) for the document. In accordance with an exemplary embodiment, the unique identifier (ID) for the document can identify a location, for example, a tray or slot within the document stacker 40a, 40b. In step S110, the document management program 222 determines if the same document has already been saved and/or placed in one or more of the trays 562 of the document stacker 560 of any document stacker 40a, 40b of the one or more documents stackers 40a, 40b. In step S110, if the document has already been saved and placed in one or more of the trays 562 of the document stacker 560 of any document stacker 40a, 40b of the one or more document stackers 40a, 40b, in step S114, the number of copies of the document is increased by one, or alternatively, increased by the number of copies that have been saved. If the same document has not already been saved, in step S110, in step S112, a new record for the document is created. In step S116, the central system returns the unique ID to the document stacker 40a, 40b. In step S118, the document stacker saves the document to an empty slot or tray 562 in the document stacker 560. In step S120, the document stacker 40a, 40b, saved the unique ID and slot location. For example, the unique ID can include information on the type of document, for example, paper, brochure, booklet, black and white, color, paper size, number of pages, etc.

Figure 7:
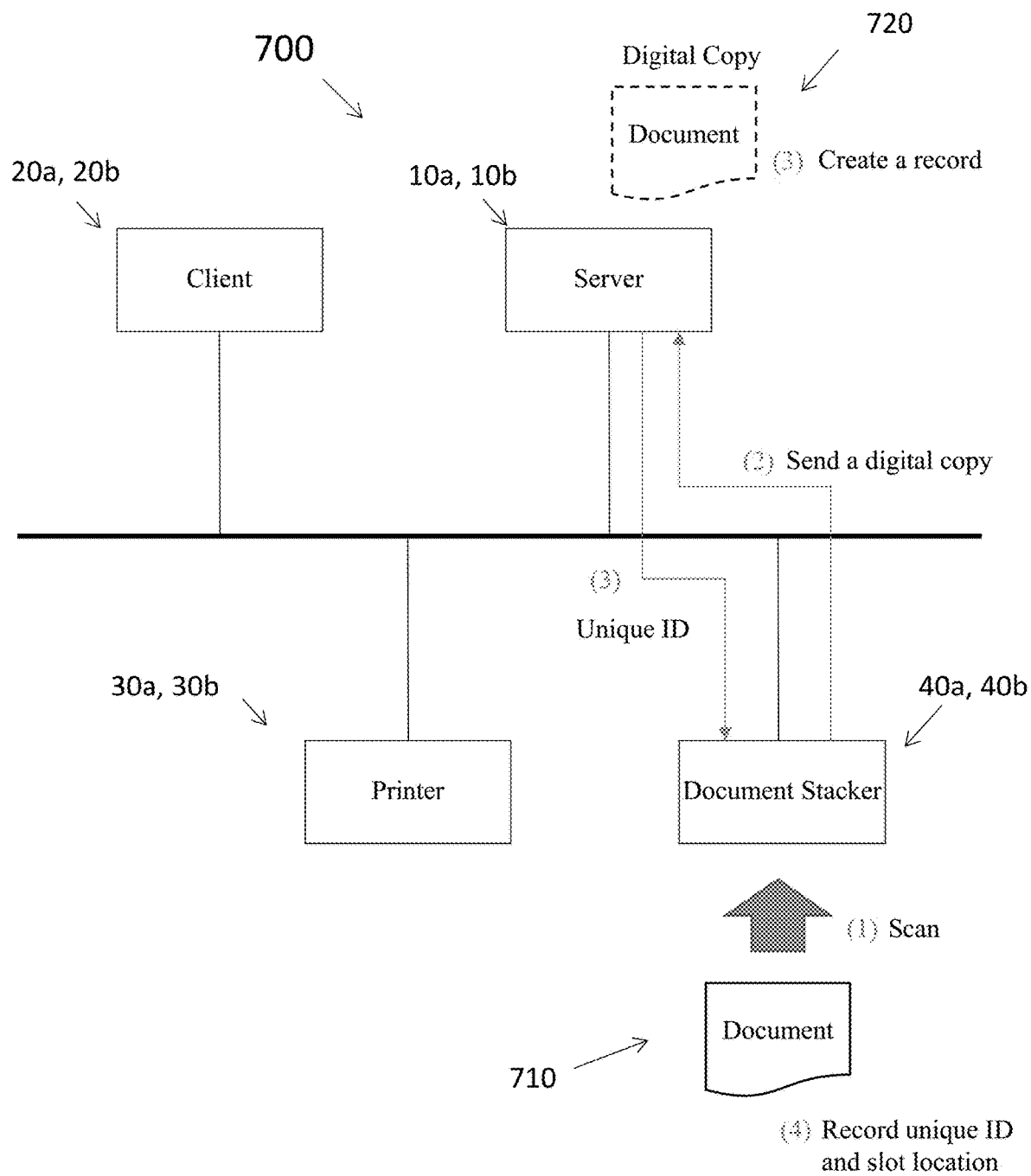
FIG. 7 is an illustration of an explanatory diagram of saving a document in accordance with an exemplary embodiment.

FIG. 7 is an illustration of an explanatory diagram 700 of saving a document in accordance with an exemplary embodiment. As shown in FIG. 7, in step 1 (S104) a document 710 is scanned by the document stacker 40a, 40b. Once the document 710 has been scanned, in step 2 (S106), a digital copy 720 of the scanned document is sent to the server 10a, 10b. In step 3 (S108), the document management program 222 in the memory 220 of the server 10a, 10b creates a record for the digital copy of the document 720. The digital management program 222 will generate the unique ID for the document 710, which is then sent to the document stacker 40a, 40b. In step 4 (S120), the document stacker 40a, 40b, receives the unique ID and records the unique ID and slot location (or tray) 562 for the document 710.

Figure 8:
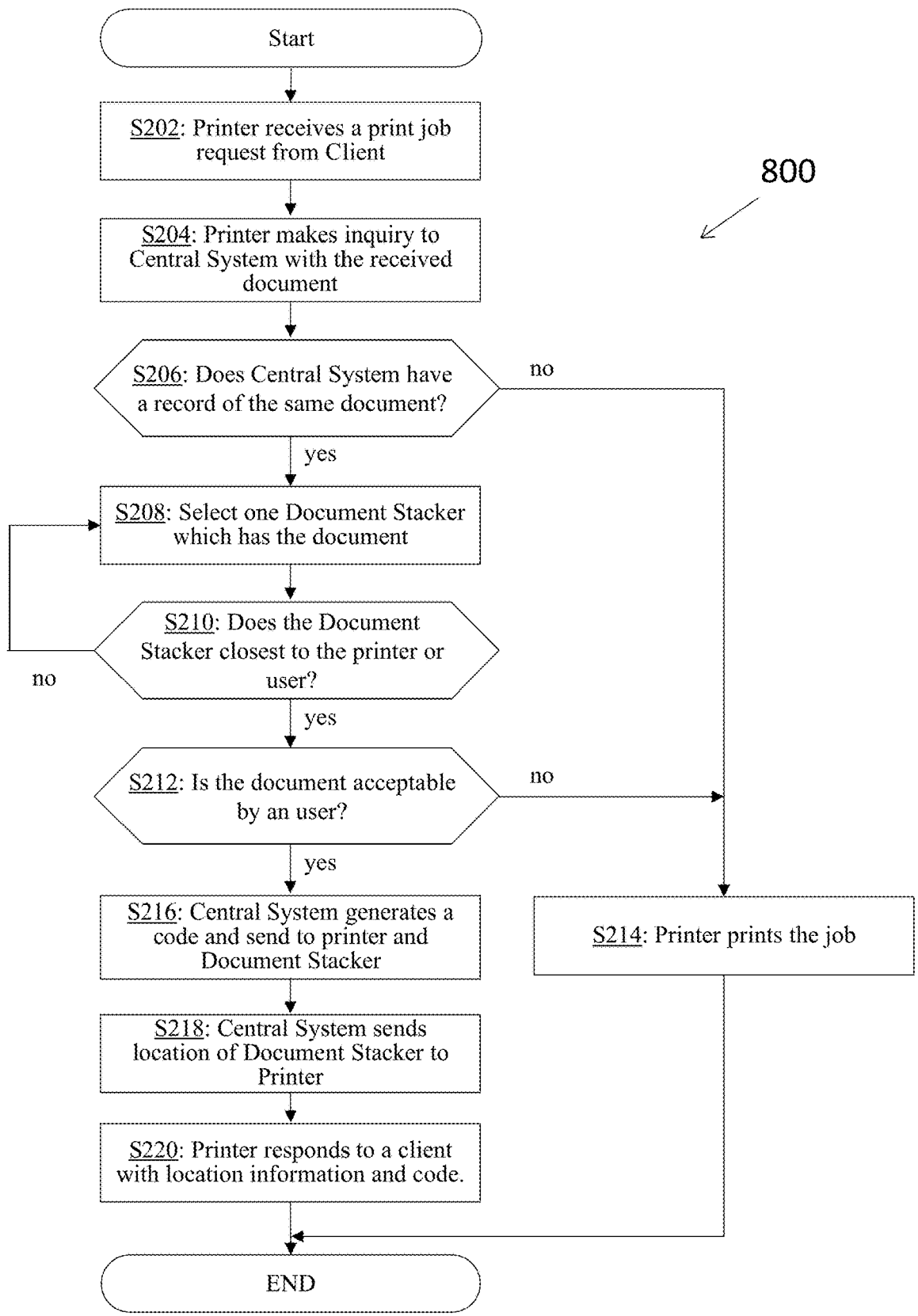
FIG. 8 is a flow chart illustrating printing a document in accordance with an exemplary embodiment.

FIG. 8 is a flow chart 800 illustrating printing a document in accordance with an exemplary embodiment. As shown in FIG. 8, in step S202, the printer 30a, 30b receives a print job request from a client or client device 20a, 20b. In step S204, the printer 30a, 30b, makes an inquiry to the central system (or document management program 222) of the server 10a, 10b about the received print job (i.e., document). In step S206, the central system (or document management program 222) make a determination if there is a record of the same document in the central system (or document management program 222). If the central system (or document management program 222) does not have a record of the same document, in step S214, the printer 30a, 30b prints the print job.

In accordance with an exemplary embodiment, if in step S206, if the central system (or document management program 222) has a record of the same document, the process continues to step S208 where a document stacker 40a, 40b having the document is selected. In step S210, a determination is made if the selected document stacker 40a, 40b is closest to the printer 30a, 30b. If the document stacker is not closet to the printer 30a, 30b, the process returns to step S208 for the selection of another document stacker 40a, 40b having the document. In step S210, if the selected document stacker 40a, 40b is closest to the printer 30a, 30b (or user), a determination is made in step S212, if the document saved in the document stacker 40a, 40b is acceptable to the user. If the document is not acceptable to the user in step S212, the process continues to step S214 where the printer 30a, 30b, prints the print job. If the document in step S212 is acceptable to the user, the process continues to step S216, where the central system (or document management program 222) generates a code and sends the code to the printer 30a, 30 and the document stacker 40a, 40b. In step S218, the central system (or document management program 222) sends the location of the document stacker 40a, 40b to the printer 30a, 30b. In step S220, the printer 30a, 30b, responds to the client or client device 20a, 20b by sending the location information of the document stacker 40a, 40b, and the code for the document provided by the central system (or document management program 222).

Figure 9:
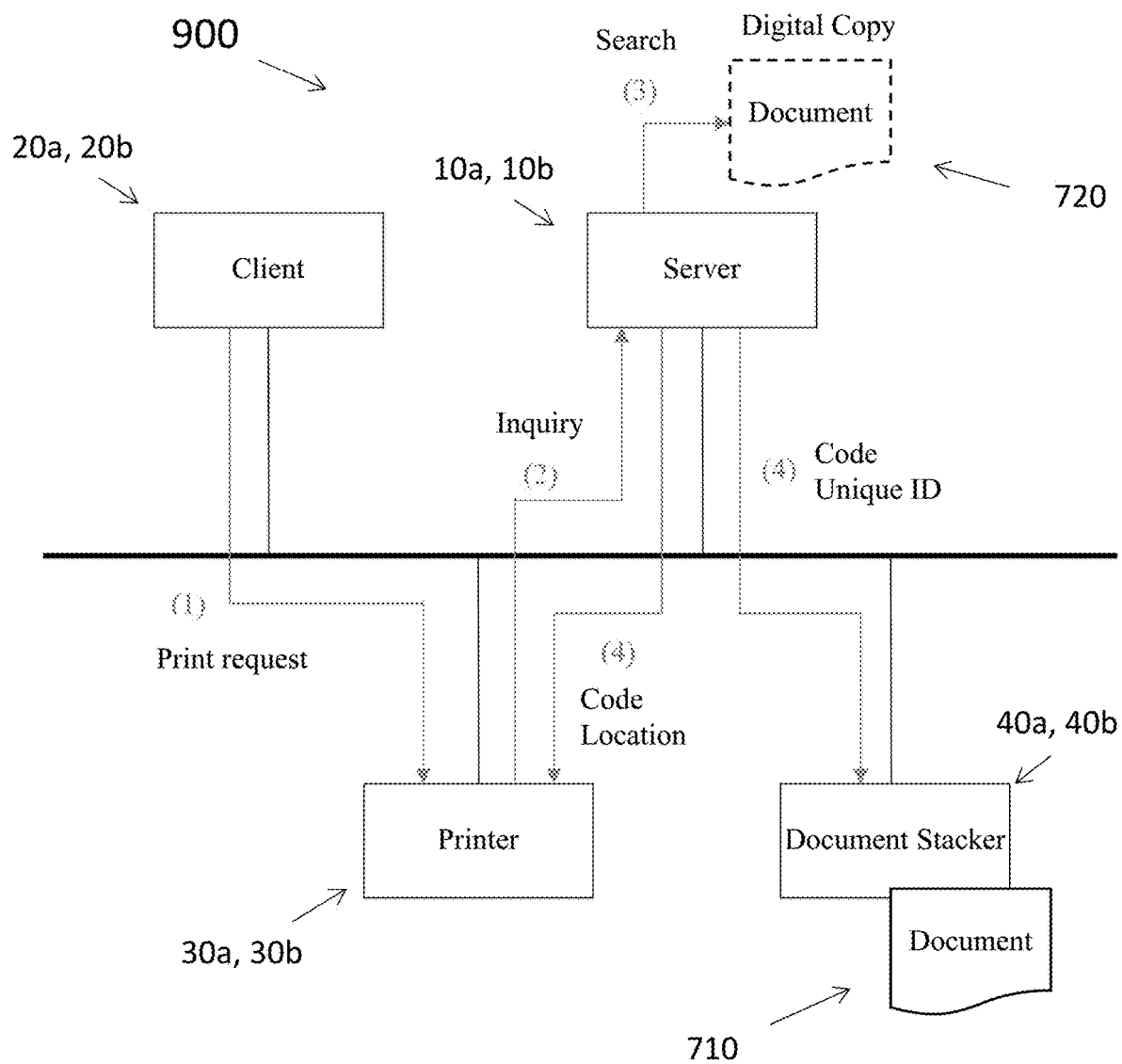
FIG. 9 is an illustration of an explanatory diagram of printing a document in accordance with an exemplary embodiment.

FIG. 9 is an illustration of an explanatory diagram 900 of printing a document in accordance with an exemplary embodiment. As shown in FIG. 9, in step 1 (S202), a print request (i.e., print job) is sent from the client or client device 20a, 20b to the printer 30a, 30b. In step 2 (S204), the printer 30a, 30b, sends an inquiry to the central system (or document management program 222) of the server 10a, 10b, if the document (or print job). In step 3 (S206), the central system (or document management program 222) makes a determination if there is a record of the same document 720 in the central system (or document management program 222). If the central system (or document management program 222) has a record of the same document 720, the process continues to step 4 (S218), where the central system (or document management program 222) sends the location of the document 710 in the document stacker 40a, 40b to the printer 30a, 30b.

Figure 10:
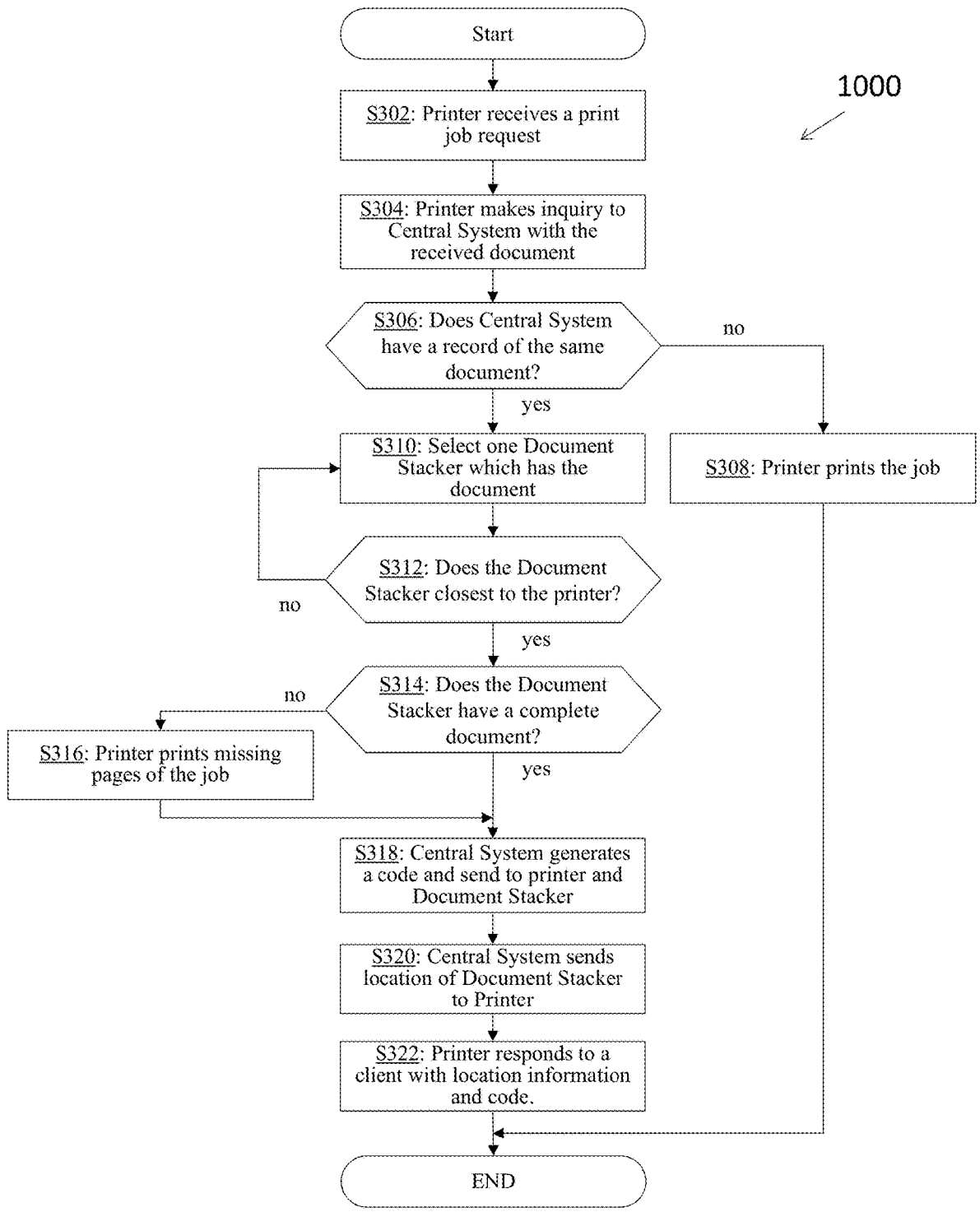
FIG. 10 is a flow chart illustrating printing a document with a partial document in a document stacker in accordance with an exemplary embodiment.

FIG. 10 is a flow chart 1000 illustrating printing a document with a partial document in a document stacker in accordance with an exemplary embodiment. As shown in FIG. 10, in step S302, the printer 30a, 30b, receives a print job request, for example, from the client or client device 20a, 20b. In step S304, the printer 30a, 30b, makes an inquiry to the central system (or document management program 222) of the server 10a, 10b about the received print job (i.e., document). In step S306, the central system (or document management program 222) make a determination if there is a record of the same document in the central system (or document management program 222). If the central system (or document management program 222) does not have a record of the same document, in step S308, the printer 30a, 30b prints the print job.

In accordance with an exemplary embodiment, if in step S306, if the central system (or document management program 222) has a record of the same document, the process continues to step S310 where a document stacker 40a, 40b having the document is selected. In step S312, a determination is made if the selected document stacker 40a, 40b is closest to the printer 30a, 30b. If the document stacker is not closet to the printer 30a, 30b, the process returns to step S310 for the selection of another document stacker 40a, 40b having the document. In step S312, if the selected document stacker 40a, 40b is closest to the printer 30a, 30b, a determination is made in step S314, if the document saved in the document stacker 40a, 40b is a complete copy of the document. If the document is not a complete copy of the document, the process continues to step S316 where the printer 30a, 30b, prints the missing pages of the print job. If the document in step S314 is a complete copy of the document, the process continues to step S318, where the central system (or document management program 222) generates a code and sends the code to the printer 30a, 30 and the document stacker 40a, 40b. In step S320, the central system (or document management program 222) send the location of the document stacker 40a, 40b to the printer 30a, 30b. In step S322, the printer 30a, 30b, responds to the client or client device 20a, 20b with location information and the code.

Figure 11:
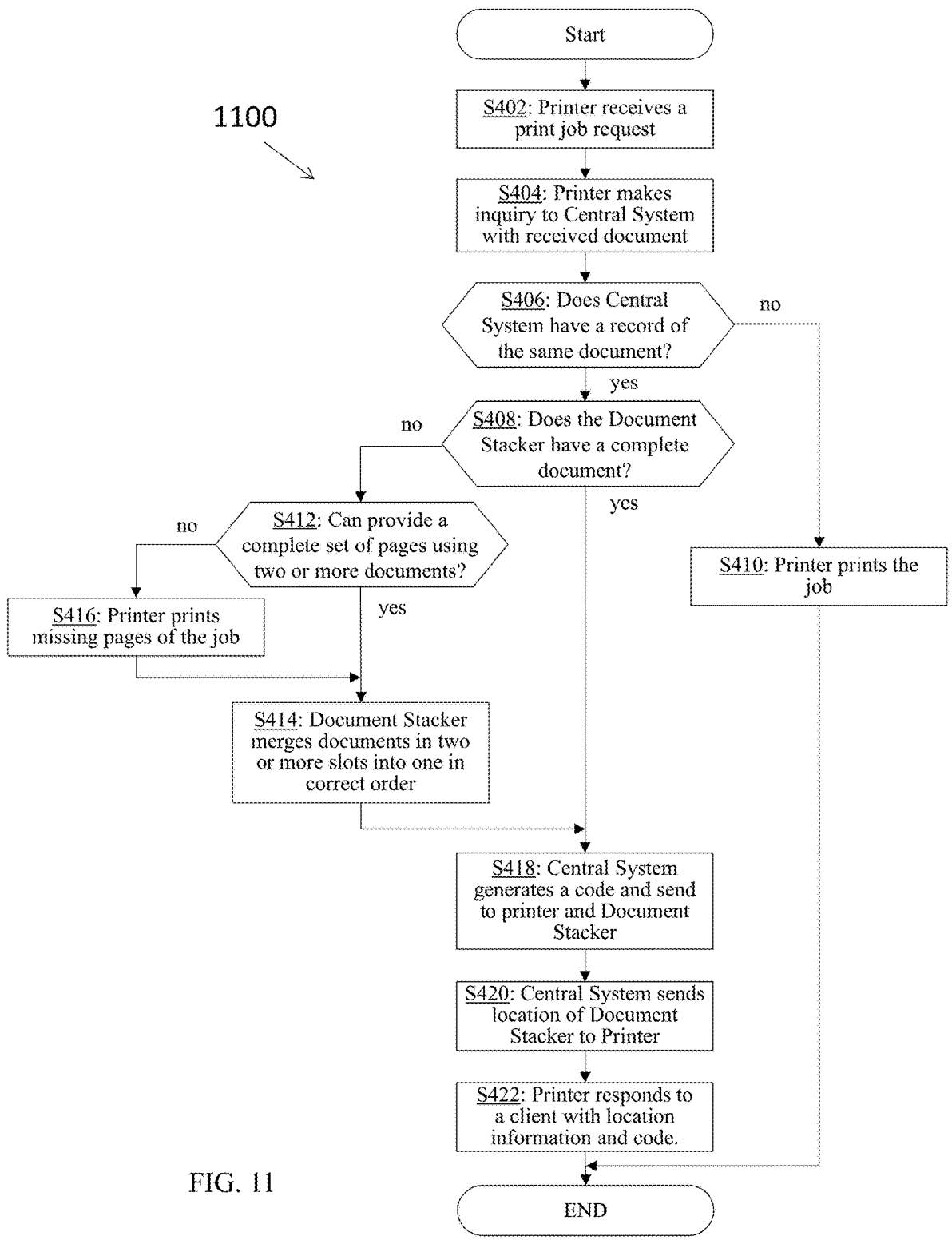
FIG. 11 is a flow chart illustrating printing a document with a partial document in a document stacker in accordance with another exemplary embodiment.

FIG. 11 is a flow chart 1100 illustrating printing a document with a partial document in a document stacker in accordance with another exemplary embodiment. As shown in FIG. 11, in step S402, the printer 30a, 30b, receives a print job request, for example, from the client or client device 20a, 20b. In step S404, the printer 30a, 30b, makes an inquiry to the central system (or document management program 222) of the server 10a, 10b about the received print job (i.e., document). In step S406, the central system (or document management program 222) make a determination if there is a record of the same document in the central system (or document management program 222). If the central system (or document management program 222) does not have a record of the same document, in step S410, the printer 30a, 30b prints the print job.

In accordance with an exemplary embodiment, if in step S406, if the central system (or document management program 222) has a record of the same document, the process continues to step S408 where a determination is made if the document stacker 40a, 40b has a complete document. If in step S408, it is determined that the document stacker 40a, 40b has a compete document, the process continued to step S418, where the central system (or document management program 222) generates a code and sends the code to the printer 30a, 30b and the document stacker 40a, 40b. In step S420, the central system (or document management program 222) send the location of the document stacker 40a, 40b to the printer 30a, 30b. In step S422, the printer 30a, 30b, responds to the client or client device 20a, 20b with location information and the code.

In accordance with an exemplary embodiment, if in step S408 it is determined that the document stacker 40a, 40b does not have a complete document, the process continues to step S412, where a determination is made if a complete set of pages can be provided using two or more documents. If the complete set of pages can be provided using two or more documents, the process continues to step S414 where the document stacker 40a, 40b merges documents from two or more trays or slots into one tray or slot in a correct order. Alternatively, if in step S412, a complete set of pages cannot be provided using two or more documents, the process continues to step S416, where the printer prints the missing pages. After the missing pages are printed, the process continues to step S414 where the document stacker 40a, 40b, merges the documents in two or more slots or trays into one tray or slot in the correct order. In accordance with an exemplary embodiment, once the documents are merged into one document in a correct order, the process continues to step S418.

Figure 12:
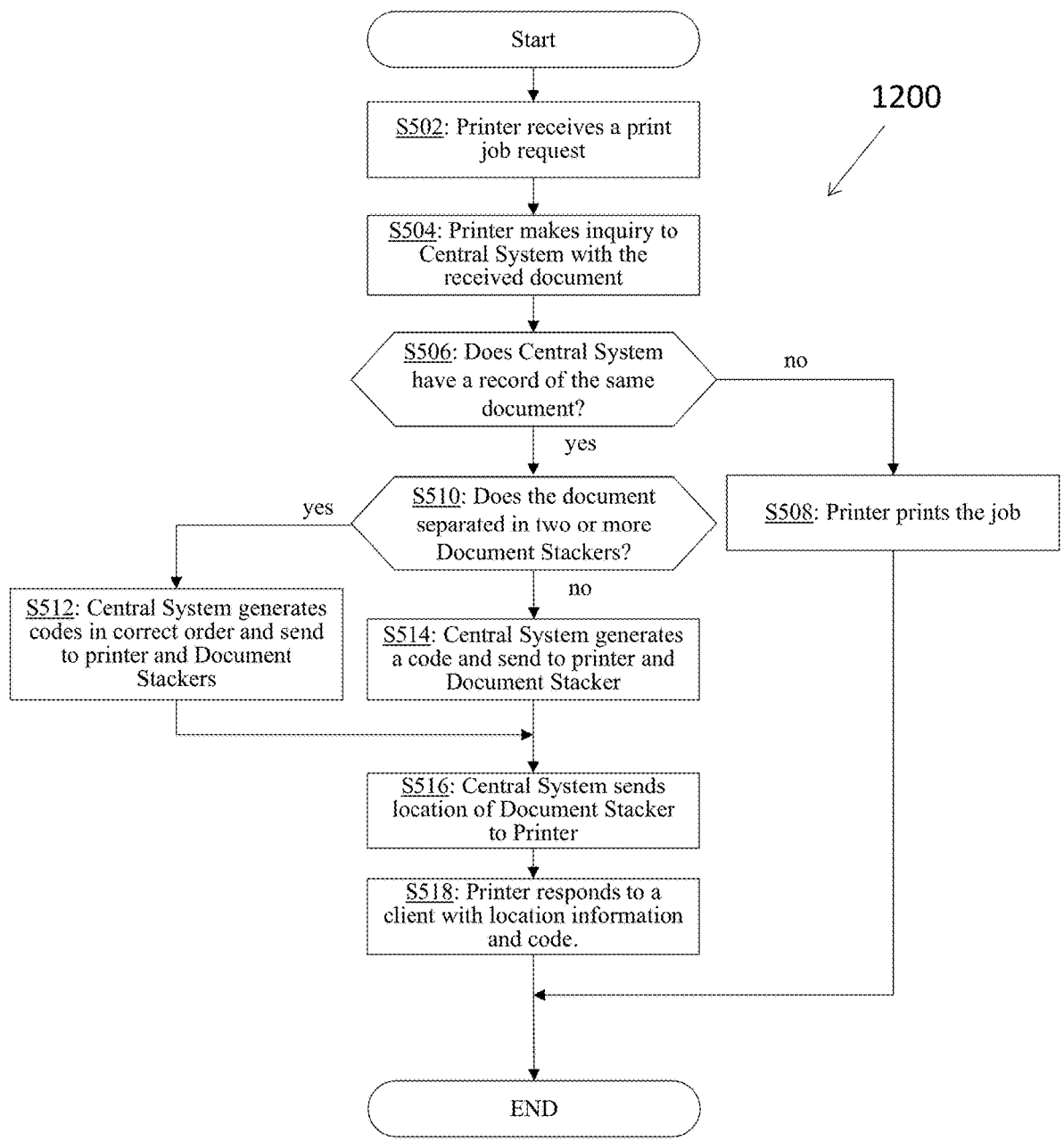
FIG. 12 is a flow chart illustrating printing a document with partial documents in a plurality of document stackers in accordance with an exemplary embodiment.

FIG. 12 is a flow chart 1200 illustrating printing a document with partial documents in a plurality of document stackers in accordance with an exemplary embodiment. As shown in FIG. 12, in step S502, the printer 30a, 30b, receives a print job request, for example, from the client or client device 20a, 20b. In step S504, the printer 30a, 30b, makes an inquiry to the central system (or document management program 222) of the server 10a, 10b about the received print job (i.e., document). In step S506, the central system (or document management program 222) make a determination if there is a record of the same document in the central system (or document management program 222). If the central system (or document management program 222) does not have a record of the same document, in step S508, the printer 30a, 30b prints the print job.

In accordance with an exemplary embodiment, if in step S506, if the central system (or document management program 222) has a record of the same document, the process continues to step S510 where a determination is made if the document stacker 40a, 40b has a complete document in two or more documents stackers 40a, 40b. If in step S510, it is determined that the document stacker 40a, 40b has a compete document in two or more document stackers 40a, 40b, the process continued to step S512, where the central system (or document management program 222) generates a code and sends the code to the printer 30a, 30b and the document stacker 40a, 40b. In step S516, the central system (or document management program 222) sends the location of the document stacker 40a, 40b to the printer 30a, 30b. In step S518, the printer 30a, 30b, responds to the client or client device 20a, 20b with location information of the document stacker 40a, 40b and the code.

In accordance with an exemplary embodiment, if in step S510 it is determined that the document stacker 40a, 40b does not have a complete document in two or more document stackers 40a, 40b, the process continues to step S514, where the central system (or document management program 222) generates a code and send the code to the printer and the document stacker. The process then proceeds to step S516.

Figure 13:
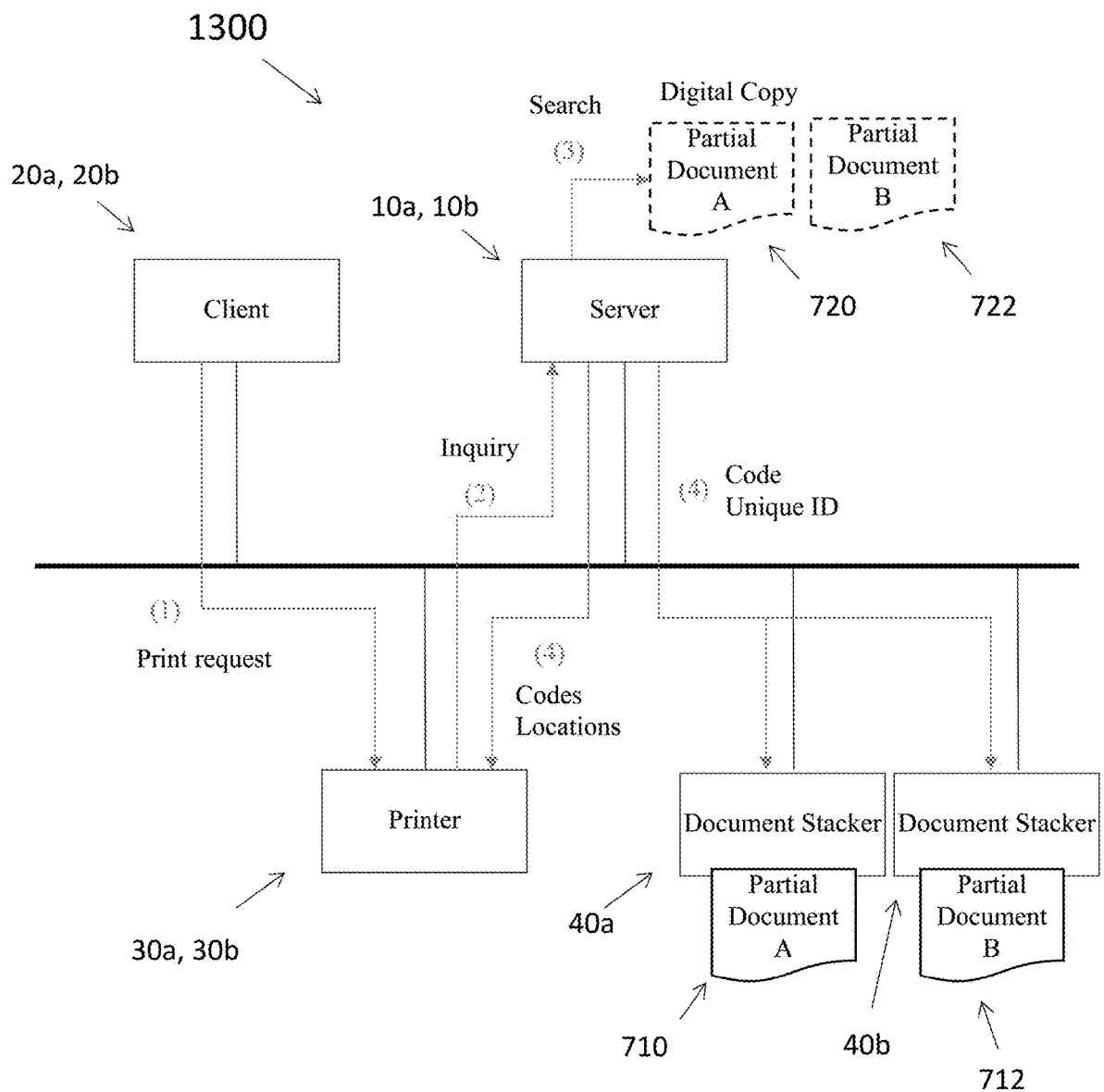
FIG. 13 is an illustration of an explanatory diagram for printing a document and releasing the document in accordance with an exemplary embodiment.

FIG. 13 is an illustration of an explanatory diagram 1300 for printing a document and releasing the document in accordance with an exemplary embodiment. As shown in FIG. 13, in step 1 (S502), the printer 30a, 30b, receives a print job request, for example, from the client or client device 20a, 20b. In step 2 (S504), the printer 30a, 30b, makes an inquiry to the central system (or document management program 222) of the server 10a, 10b about the received print job (i.e., document). In step 3 (S506), the central system (or document management program 222) make a determination if there is a record of the same document 720, 722 in the central system (or document management program 222). If in step 3 (S506), the central system (or document management program 222) has a record of the same document 720, 722, and determines that the document stacker 40a, 40b has a compete document 710, 712 in two or more document stackers 40a, 40b, the process continued to step 4 (S512), where the central system (or document management program 222) generates a code and sends the code to the printer 30a, 30 and the document stacker 40a, 40b.

Figure 14:
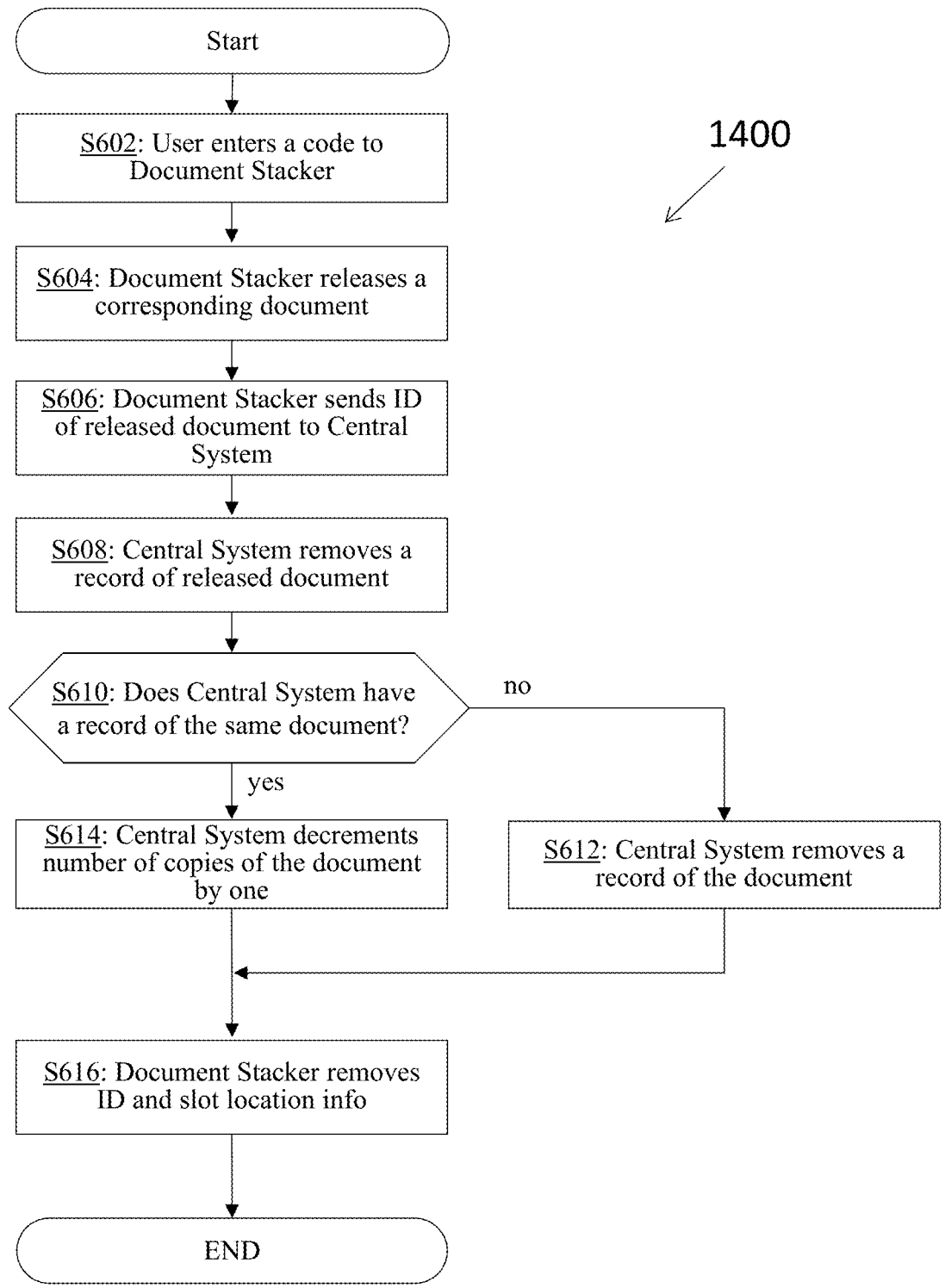
FIG. 14 is a flow chart illustration releasing a document in accordance with an exemplary embodiment.

FIG. 14 is a flow chart 1400 illustration releasing a document in accordance with an exemplary embodiment. As shown in FIG. 14, in step S602, the user enters a code into the document stacker 40a, 40b, for example, on the display unit 540 of the document stacker 40a, 40b. In step S604, the document stacker 40a, 40b, releases a corresponding document for the code. In step S606, the document stacker 40a, 40b sends an identifier (ID) of the released document to the central system (or document management program 222). In step S608, the central system (or document management program 222) removes a record of the released document. In step S610, a determination is made if the central system (or document management program 222) has a record of the released document. If the central system (or document management program 222) does not have a record of the released document, i.e., the document stacker 40a, 40b, does not have any additional copies of the same document, the central system (or document management program 222) removes a record of the document from the system. If the central system (or document management program 222) has a record of the same document, the number of copies of the document is reduced, for example, by one. In step S616, the document stacker 40a, 40b, removes the identifier (ID) and slot location information.

Figure 15:
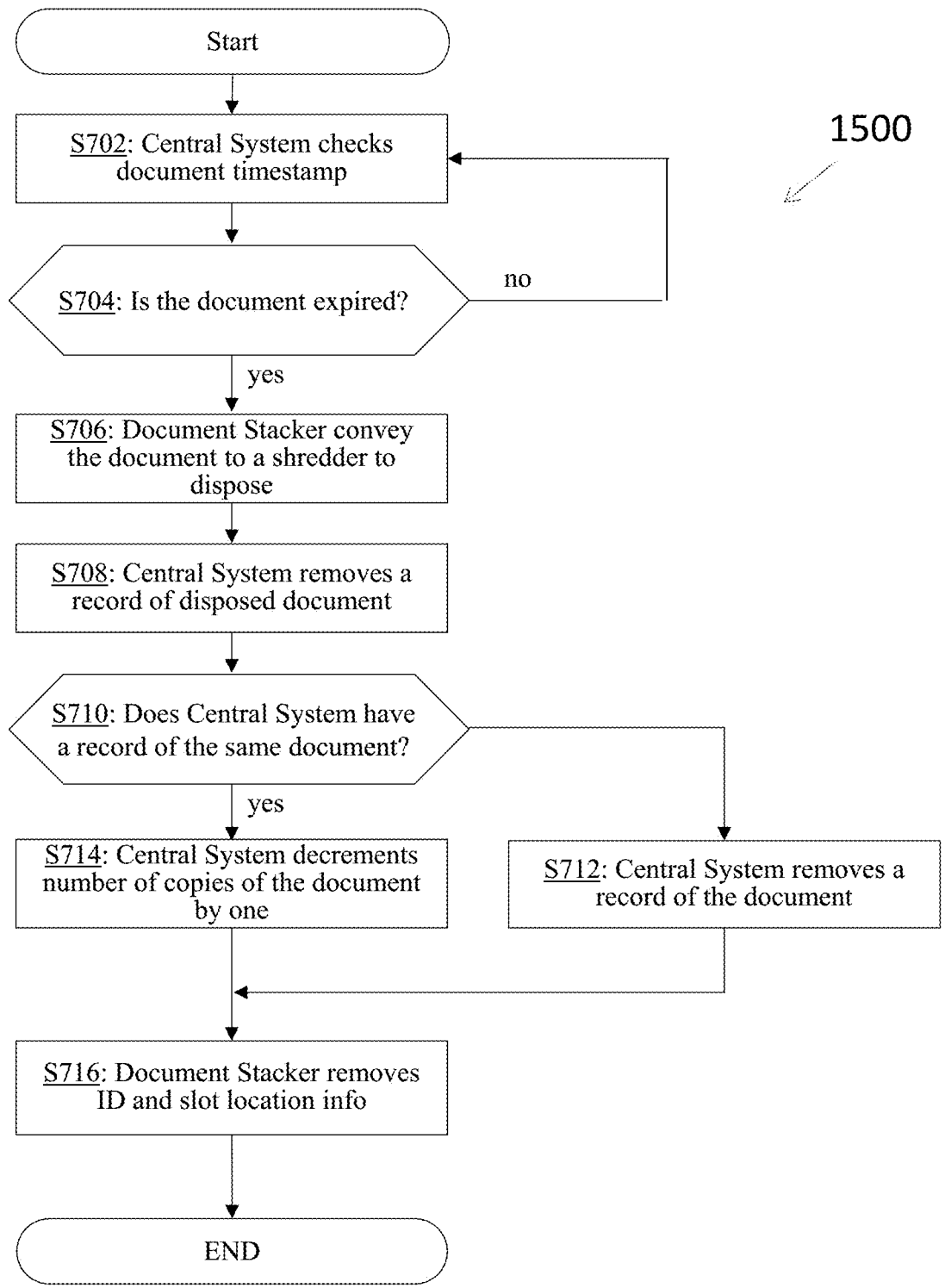
FIG. 15 is a flow chart illustration disposal of a document in accordance with an exemplary embodiment.

FIG. 15 is a flow chart 1500 illustration disposal of a document in accordance with an exemplary embodiment. As shown in FIG. 15, in step S702, the central system (or document management program 222) checks a timestamp on the document. In step S704, a determination is made if the document has expired, i.e., has a predetermined period of time for retention or retaining the document expired. If the timestamp of the document has not expired, the process returns to step S702S. If in step S704, if it is determined that the timestamp on the document has expired, the process continues to step S706, the document stacker 40a, 40b conveys the document to a shredder for disposal. In step S708, the central system (or document management program 222) removes a record of the disposed document. In step S710, the central system (or document management program 222) determines if a record of the same document. If the central system (or document management program 222) does not have any record of the document, the process continues to step S712, where the central system (or document management program 222) removes a record of the document. If the central system (or document management program 222) has a record of the document, the central system (or document management program 222) reduces the number of copies of the document in the central system (or document management program 222) by, for example, one, or the number of copies that were shredded. In step S716, the document stacker 40a, 40b, removes the identifier (ID) and slot location information for the shredded document.

Figure 16:
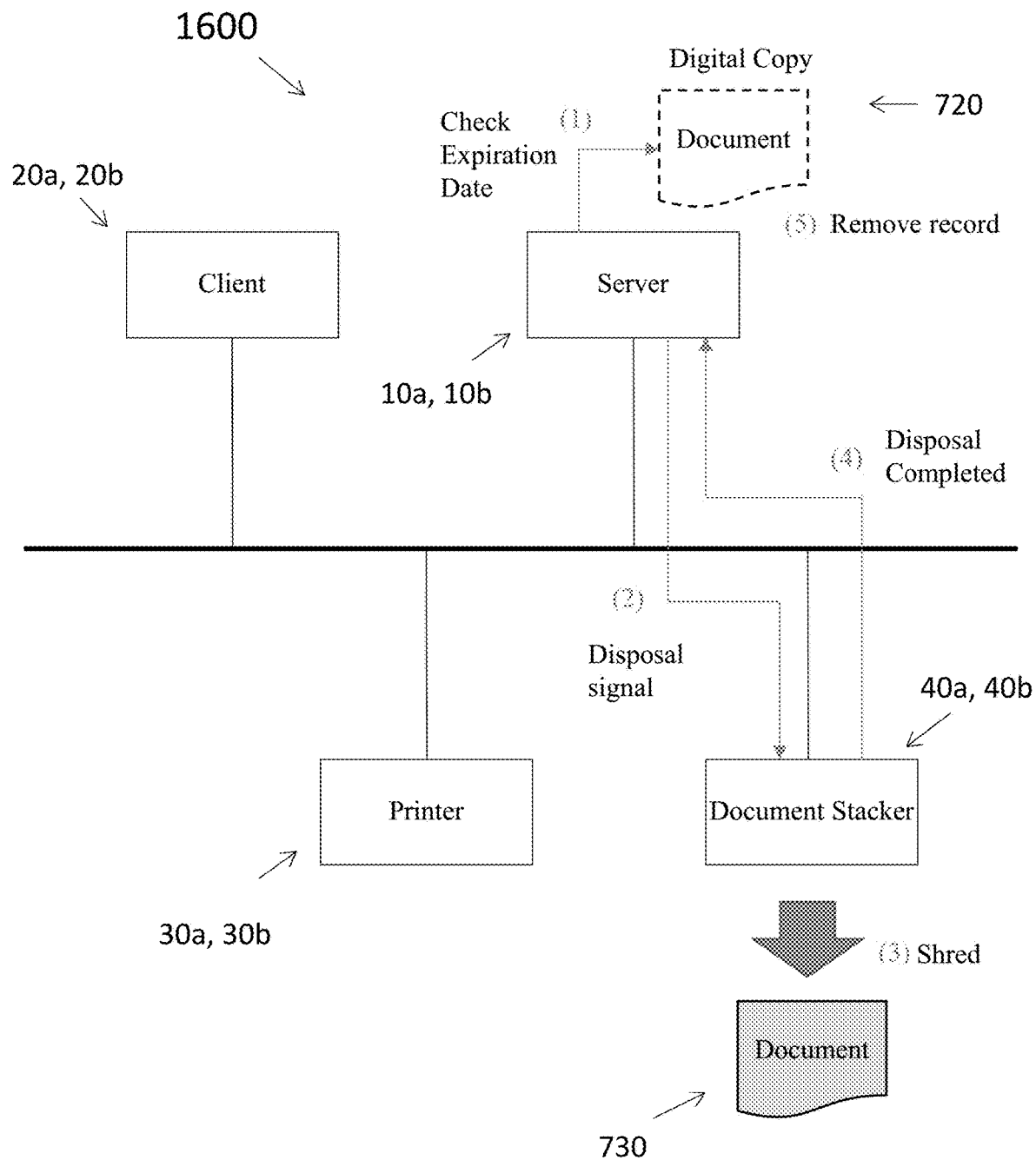
FIG. 16 is an explanatory diagram of disposing a document in accordance with an exemplary embodiment.

FIG. 16 is an explanatory diagram 1600 of disposing a document in accordance with an exemplary embodiment. As shown in FIG. 16, in step 1 (S702), the central system (or document management program 222) checks a timestamp on the document. In step 2 (S704), if it is determined that the timestamp on the document has expired, the process continues to step 3 (S706), the document stacker 40a, 40b conveys the document 730 to a shredder for disposal. In step 4 (S708, the central system (or document management program 222) removes a records of the disposed document upon receipt of confirmation from the document stacker 40a, 40b has been shredded. In step 5 (S710), the central system (or document management program 222) determines if a record of the same document. If the central system (or document management program 222) does not have any record of the document 720, the central system (or document management program 222) removes a record of the document. If the central system (or document management program 222) has a record of the document, the central system (or document management program 222) reduces the number of copies of the document in the central system (or document management program 222) by, for example, one, or the number of copies that were shredded.

Figure 17:
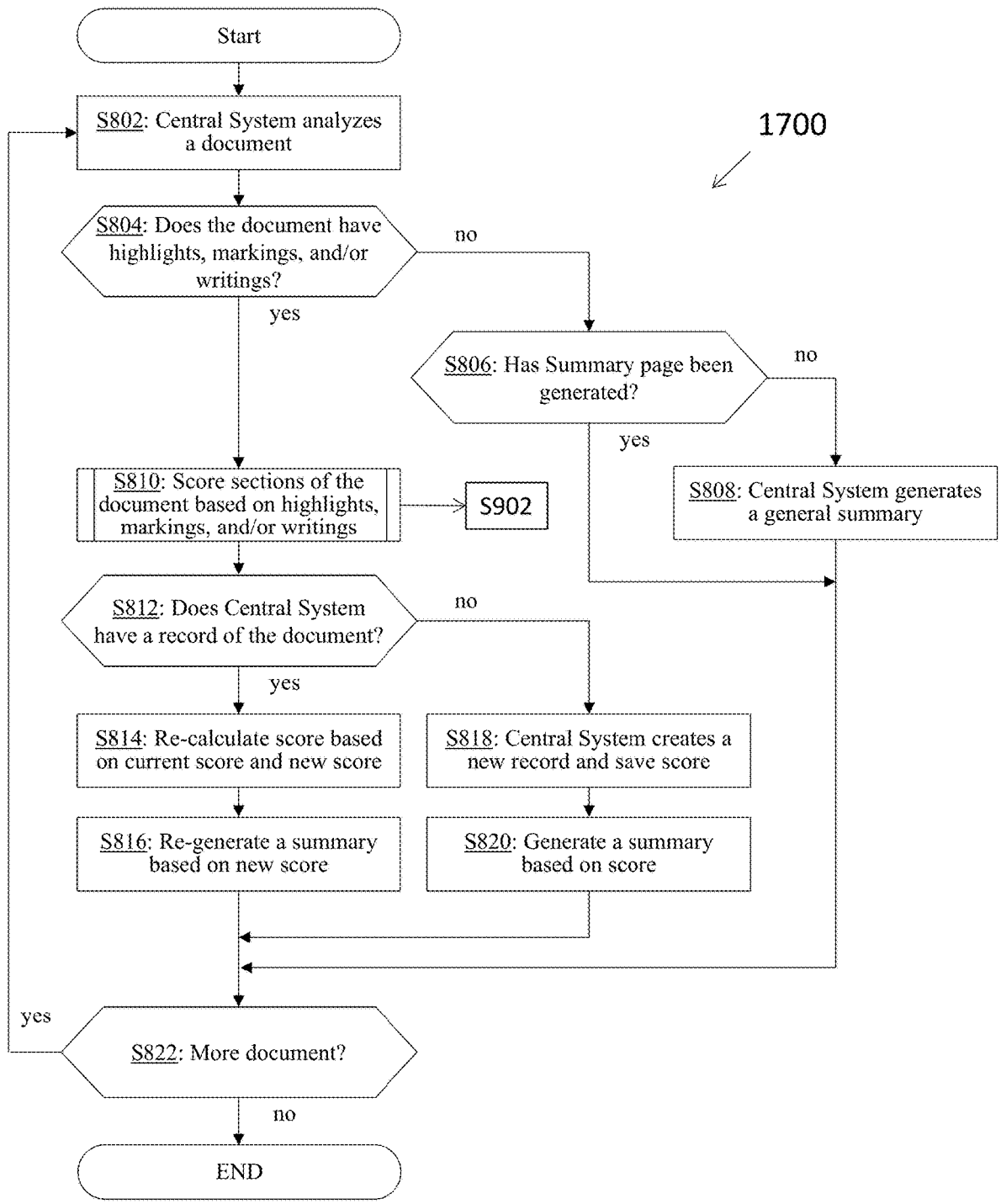
FIG. 17 is a flow chart illustrating of generating a summary based on a score in accordance with an exemplary embodiment.

FIG. 17 is a flow chart 1700 illustrating of generating a summary based on a score in accordance with an exemplary embodiment. As shown in FIG. 17, in step S802, the central system (or document management program 222) analyzes a document. In step S804, a determination is made if the document has any highlights, markings, and/or writings. If in step S804, if it is determined that the document does not have any highlights, markings, and/or writings, the process continues to step S806 for determination if a summary page has been generated. If in step S806, a summary page has not been generated for the document, the process continues to step S808 where the central system (or document management program 222) generates a general summary of the document. In step S806, if a summary has been generated, the process continues to step S822.

Figure 19:
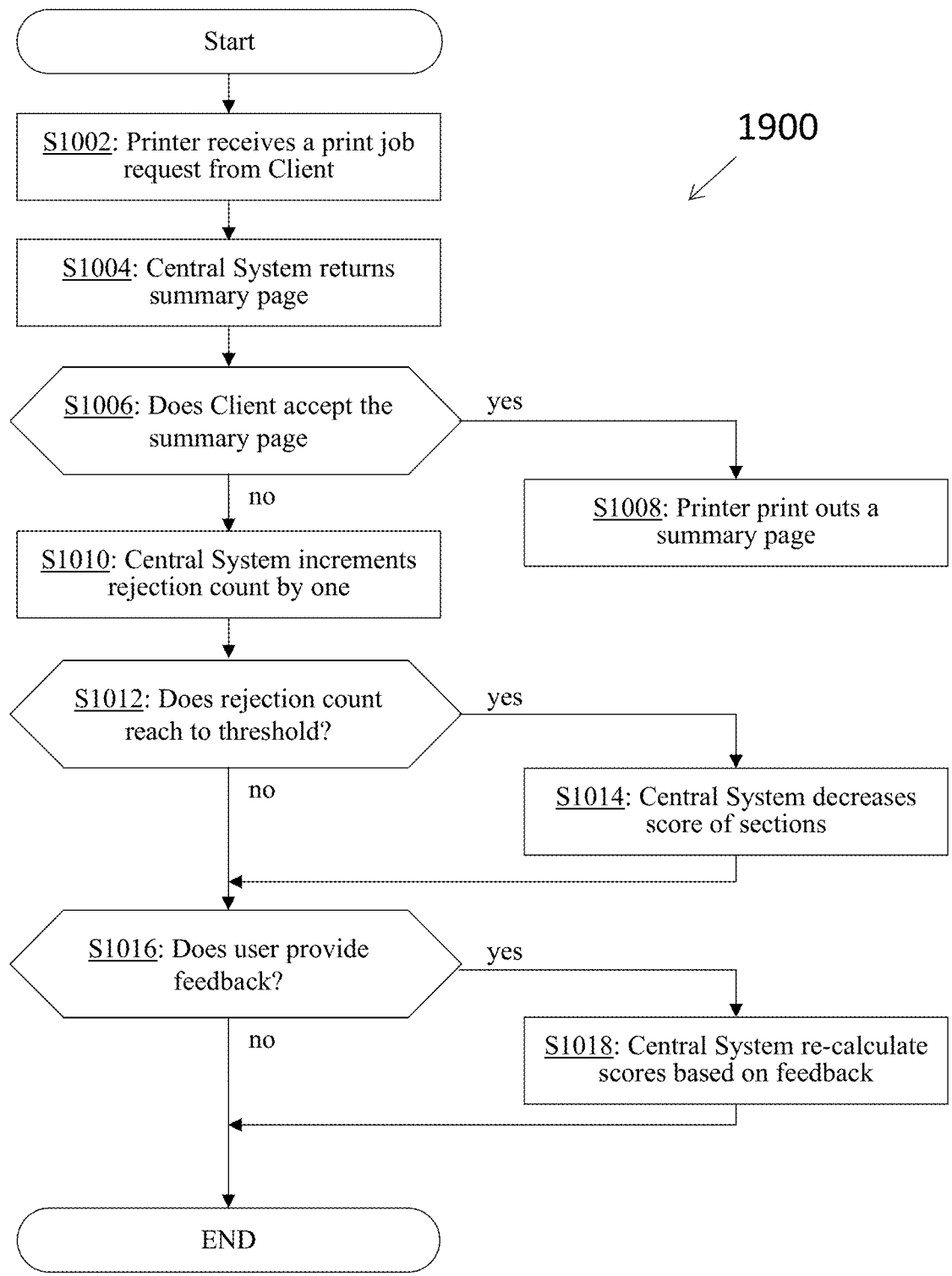
FIG. 19 is a flow chart illustrating a score adjustment based on feedback in accordance with an exemplary embodiment.

If in step S804, the document has highlights, markings, and/or writings, the process continues to step S810, where the central system (or document management program 222) scores sections of the document based on the highlights, markings, and/or writings as shown in FIG. 19. In accordance with an exemplary embodiment, the score can correspond to a desired use of the document, for example, cleanliness, or alternatively, information that has been added to the document. In step S812, the central system (or document management program 222) determines if the central system (or document management program 222) has a record of the document. In step S812, if the central system (or document management program 222) does not have a record of the document, the process continues to step S818 where the central system (or document management program 222) creates a new record and saves the score. After creating a new record and saving the score, the process continues to step S820 where a summary based on the score is generated in the central system (or document management program 222).

In step S812, if the central system (or document management program 222) has a record of the document, the process continues to step S814 where the central system (or document management program 222) re-calculates score bases on a current score and generates a new score. The process then proceeds to step S816, where the central system (or document management program 222) generates a summary based on the new score. In accordance with an exemplary embodiment, the process continues to step S822, where the central system (or document management program 222) checks for additional documents.

Figure 18:
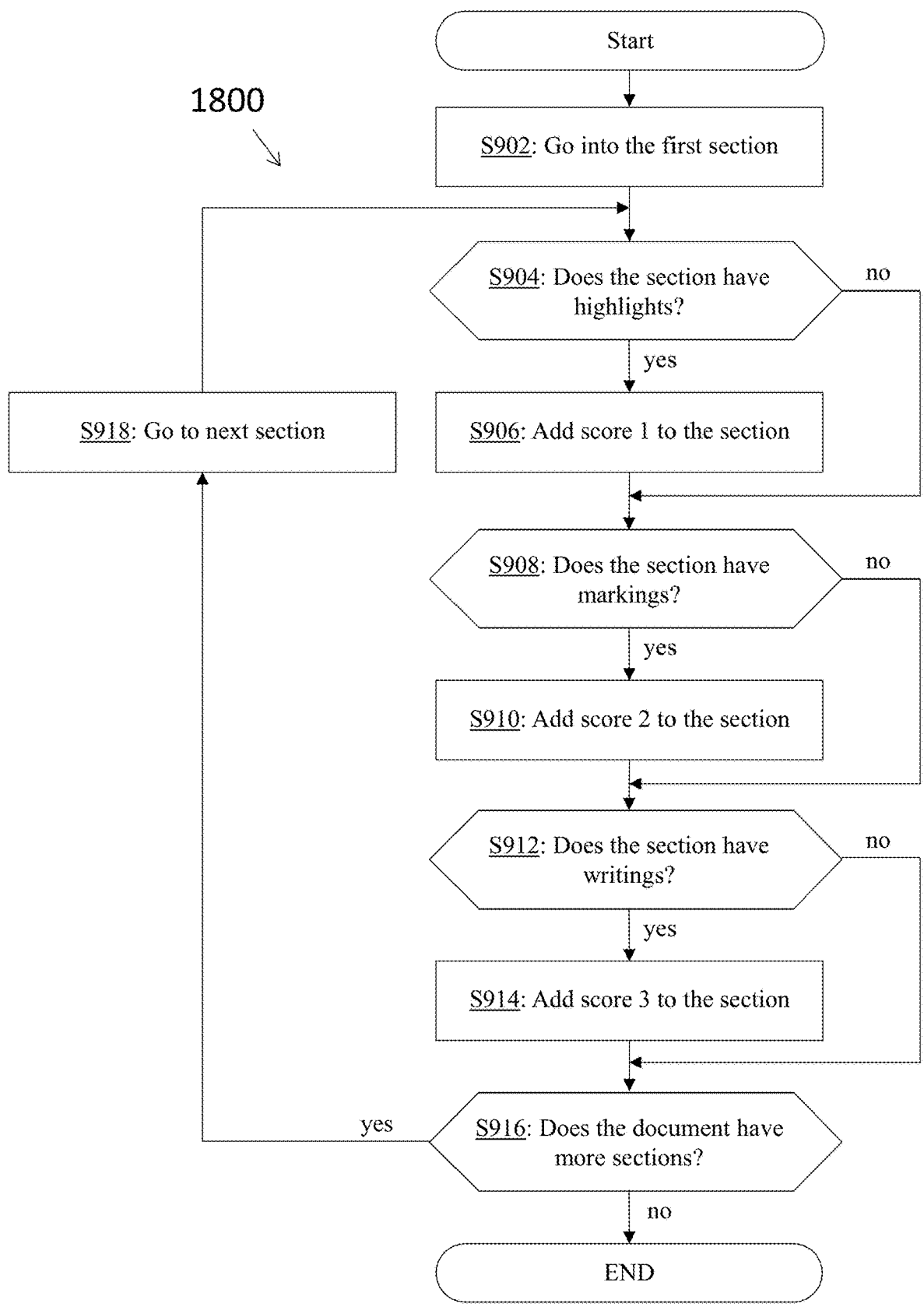
FIG. 18 is a flow chart illustrating a scoring sub routine in accordance with an exemplary embodiment.

FIG. 18 is a flow chart 1800 illustrating a scoring sub routine (S810) in accordance with an exemplary embodiment. As shown in FIG. 18, in step S902, the central system (or document management program 222) goes into a first section of the document. In step S904, the central system (or document management program 222) determines if the section of the document has any highlights. If the section does not have any highlights, the process continues to step S908. However, if the section has highlights, in step S906, the central system (or document management program 222) adds score 1 to the section. The process then continues to step S908 where the central system (or document management program 222) determines if the section has any markings. If in step S908, the section does not have any markings, the process continues to step S912. However, if the section has markings, in step S910, the central system (or document management program 222) adds score 2 to the section. The process then continues to step S912, where the central system (or document management program 222) determines if the section has any writings. If in step S912, the section does not have any writing, the process continues to step S916. However, if the section has markings, in step S914, the central system (or document management program 222) adds score 3 to the section. In step S916, the central system (or document management program 222) determines if the documents has any more sections to analyze. If no additional sections are to be analyzed the process ends and the process returns to step S812 (FIG. 17). If additional sections are to be analyzed, the process continues to step S918 to go to the next section. In accordance with an exemplary embodiment, each score 1, score 2, and score 3, reflect that the section has a highlight, markings, or writings, respectively.

FIG. 19 is a flow chart 1900 illustrating a score adjustment based on feedback in accordance with an exemplary embodiment. As shown in FIG. 19, in step S1002, the printer 30a, 30b, receives a print job request from the client or client device 20a, 20b. In step S1004, the central system (or document management program 222) returns a summary page to the client or client device 20a, 20b. For example, the summary page can be generated based on, for example, each of the sections that includes one or more of a score 1, a score 2, and/or a score 3. In step S1006, a determination is made if the client accepts the summary page. If in step S1006, if the client or client device 20a, 20b, accepts the summary page, the process continues to step S1008, the printer 30a, 30b, prints out the summary page. In step S1006, if the client does not accept the summary page, the process continues to step S1010, where the central system (or document management program 222) increases the rejection count by one for the document. In step S1012, the central system (or document management program 222) determines if a rejection count for the summary page reach a predetermined threshold. If the rejection count for the summary page reaches the predetermined threshold, the process continues to step S1014 where the central system (or document management program 222) decreases score of corresponding sections. If the rejection count does not reach the predetermined threshold, the process continues to step S1016, the central system (or document management program 222) determines if the user provides feedback on the summary. If the user provides feedback, in step S1018, the central system (or document management program 222) recalculates scores based on the feedback. If no feedback from the user, the process ends.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method to detect and avoid printing of print jobs previously printed, the method comprising:
    storing one or more digital copies of print jobs in a central storage system;
    storing one or more physical copies of the one or more digital copies of the print jobs in a document stacker;
    receiving a print job on a printer;
    sending a request from the printer to the central storage system to determine if a physical copy of the print job is in the document stacker; and
    when the print job is in the document stacker sending a code from the central storage system for retrieval of a physical copy of the print job from the document stacker.

2. The method according to claim 1, further comprising:
    scanning the one or more physical copies on the document stacker;
    sending the one or more digital copies of the print jobs to the central storage system from the document stacker; and
    storing the one or more physical copies scanned by the document stacker in trays in the document stacker.

3. The method according to claim 2, comprising:
    creating a new record in the central storage system for a physical document that has not previously been scanned by the document stacker; and
    increasing a number of copies in the central storage system for a physical document that has previously scanned by the document stacker.

4. The method according to claim 1, comprising:
    assigning each of the one or more digital copies of print jobs in the central storage system a unique identifier.

5. The method according to claim 1, wherein the document stacker comprises a plurality of document stackers, the method comprising:
    storing the one or more physical copies of the one or more digital copies of the print jobs in the plurality of document stackers;
    sending the code for retrieval of the physical copy of the print job from a document stacker closest to the printer or user from the plurality of document stackers;
    determining if the physical copy of the print job is acceptable to a user; and
    when the physical copy of the print job is not acceptable, printing the print job on the printer.

6. The method according to claim 1, wherein the physical copy of the print job stored in the document stacker is not an entirety of the print job, the method comprising:
    printing missing pages of the print job on the printer.

7. The method according to claim 1, wherein the physical copy of the print job is stored in two or more trays of the document stacker, the method comprising:
    merging the physical copies of the print job from the two or more trays of the document stacker into a single document.

8. The method according to claim 1, wherein the document stacker comprises a plurality of document stackers and the physical copy of the print job is stored in two or more document stackers of the plurality of document stackers, the method comprising:
    sending a plurality of codes to the printer for the print job, the plurality of codes providing an order of pages to be retrieved and a location of a corresponding document stacker to retrieve the physical copy of the print job; and
    retrieving a portion of the print job from each of the two or more document stackers.

9. The method according to claim 1, comprising:
entering the code into a digital display unit on the document stacker, the document stacker being configured to retrieve the physical copy of the print job from a tray of the document stacker;
sending a communication to the central system confirming release of the physical copy of the print job from the document stacker; and
updating a number of copies of the print job in the central system.

10. The method according to claim 1, further comprising:
timestamping the one or more digital copies of print jobs stored in the central storage system; and
conveying instructions to the document stacker to shred the physical copies of the one or more digital copies of print jobs stored in the document stacker upon an expiration of a predetermined date assigned to the print jobs.

11. The method according to claim 1, comprising:
assigning a score to the one or more digital copies of print jobs in the central storage system having highlights, markings, and/or writings on the one or more physical copies, the score corresponding to feedback from users in the form of the highlights, markings, and/or writings on the one or more physical copies.

12. The method according to claim 11, comprising:
generating a summary of the one or more digital copies of print jobs in the central storage system based on the score from the highlights, markings, and/or writings.

13. A non-transitory computer readable medium (CRM) storing computer program code executed by a computer processor that performs a method for detection and avoidance of printing print jobs previously printed, the method comprising:
storing one or more digital copies of print jobs in a central storage system;
storing one or more physical copies of the one or more digital copies of the print jobs in a document stacker;
receiving a print job on a printer;
sending a request from the printer to the central storage system to determine if a physical copy of the print job is in the document stacker; and
when the print job is in the document stacker sending a code from the central storage system for retrieval of a physical copy of the print job from the document stacker.

14. The non-transitory computer readable medium according to claim 13, further comprising:
scanning the one or more physical copies on the document stacker;
sending the one or more digital copies of the print jobs to the central storage system from the document stacker; and
storing the one or more physical copies scanned by the document stacker in trays in the document stacker.

15. The non-transitory computer readable medium according to claim 14, comprising:
creating a new record in the central storage system for a physical document that has not previously been scanned by the document stacker; and
increasing a number of copies in the central storage system for a physical document that has previously scanned by the document stacker.

16. The non-transitory computer readable medium according to claim 13, comprising:
assigning each of the one or more digital copies of print jobs in the central storage system a unique identifier.

17. The non-transitory computer readable medium according to claim 13, wherein the document stacker comprises a plurality of document stackers, the method comprising:
storing the one or more physical copies of the one or more digital copies of the print jobs in the plurality of document stackers;
sending the code for retrieval of the physical copy of the print job from a document stacker closest to the printer or user from the plurality of document stackers;
determining if the physical copy of the print job is acceptable to a user; and
when the physical copy of the print job is not acceptable, printing the print job on the printer.

18. The non-transitory computer readable medium according to claim 13, wherein the physical copy of the print job stored in the document stacker is not an entirety of the print job, the method comprising:
printing missing pages of the print job on the printer.

19. A system for detection and avoidance of printing print jobs previously printed, the system comprising:
a server having a memory and a processor, the processor configured to:
store one or more digital copies of print jobs;
a document stacker configured to:
scan one or more physical copies of the one or more digital copies of the print jobs;
send the one or more digital copies of the print jobs to the central storage system from the document stacker;
store the one or more physical copies scanned by the document stacker in trays; and
shred the physical copies of the one or more digital copies of print jobs stored in the document stacker upon an expiration of a predetermined date assigned to the print jobs; and
a printer configured to:
receive a print job;
sending a request from the printer to the server to determine if a physical copy of the print job is in the document stacker; and
when the print job is in the document stacker receiving a code from the server for retrieval of a physical copy of the print job from the document stacker.

20. The system according to claim 19, wherein the processor of the server is configured to:
create a new record in the central storage system for a physical document that has not previously been scanned by the document stacker;
increase a number of copies in the central storage system for a physical document that has previously scanned by the document stacker; and
assign each of the one or more digital copies of print jobs in the central storage system a unique identifier.

* * * * *